United States Patent
Rastegardoost et al.

(10) Patent No.: US 11,646,832 B2
(45) Date of Patent: May 9, 2023

(54) HARQ FEEDBACK COLLISION IN UNLICENSED BANDS

(71) Applicant: Ofinno, LLC, Reston, VA (US)

(72) Inventors: Nazanin Rastegardoost, McLean, VA (US); Esmael Hejazi Dinan, McLean, VA (US); Yunjung Yi, Vienna, VA (US); Hyoungsuk Jeon, Centreville, VA (US); Hyukjin Chae, Reston, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

(21) Appl. No.: 17/226,450

(22) Filed: Apr. 9, 2021

(65) Prior Publication Data

US 2021/0320760 A1 Oct. 14, 2021

Related U.S. Application Data

(60) Provisional application No. 63/007,853, filed on Apr. 9, 2020.

(51) Int. Cl.
*H04L 1/18* (2006.01)
*H04W 74/08* (2009.01)
(Continued)

(52) U.S. Cl.
CPC ....... *H04L 1/1854* (2013.01); *H04W 72/0406* (2013.01); *H04W 74/0816* (2013.01)

(58) Field of Classification Search
CPC ... H04L 1/0027; H04L 1/0028; H04L 1/0061; H04L 1/1819; H04L 1/1854;
(Continued)

(56) References Cited

U.S. PATENT DOCUMENTS

2020/0314815 A1* 10/2020 Kim .................. H04L 1/1671
2020/0337083 A1* 10/2020 Loehr ............... H04W 74/0808
(Continued)

FOREIGN PATENT DOCUMENTS

WO 2019035921 2/2019
WO 2020144402 7/2020
(Continued)

OTHER PUBLICATIONS

3GPP TS 36.213 V15.4.0 (Dec. 2018); Technical Specification; 3rd Generation Partnership Project; Technical Specification Group Radio Access Network; Evolved Universal Terrestrial Radio Access (E-UTRA); Physical layer procedures; (Release 15).
(Continued)

*Primary Examiner* — Awet Haile
(74) *Attorney, Agent, or Firm* — Trent W. Merrell; Kavon Nasabzadeh; Philip R. Smith

(57) ABSTRACT

Described are embodiments for transmitting hybrid automatic repeat request (HARQ) feedback information. In one embodiment, a wireless device receives a first downlink control information (DCI) indicating a first slot for transmission of uplink control information (UCI) comprising the HARQ feedback information. The wireless device receives a second DCI scheduling a plurality of physical uplink channels (PUSCHs) in a plurality of consecutive slots comprising the first slot. The wireless device multiplexes the UCI in a first PUSCH, of the plurality of PUSCHs, in the first slot. In response to a failed listen-before-talk (LBT) procedure for the first slot, the wireless device determines a second slot associated with a second PUSCH of the plurality of PUSCHs, and transmits, in response to a successful LBT procedure for the second slot, the UCI via the second PUSCH.

20 Claims, 24 Drawing Sheets

(51) Int. Cl.
*H04W 72/04* (2009.01)
*H04L 1/1829* (2023.01)

(58) Field of Classification Search
CPC . H04L 1/1896; H04L 27/0006; H04L 5/0044; H04L 5/0055; H04L 5/0094; H04W 72/0406; H04W 72/1284; H04W 74/0808; H04W 74/0816
See application file for complete search history.

(56) References Cited

U.S. PATENT DOCUMENTS

| | | | | |
|---|---|---|---|---|
| 2021/0392684 | A1* | 12/2021 | Tiirola | H04W 72/0453 |
| 2022/0014333 | A1* | 1/2022 | Bhamri | H04L 5/0053 |
| 2022/0174721 | A1* | 6/2022 | Oviedo | H04L 1/1861 |

FOREIGN PATENT DOCUMENTS

| | | | | |
|---|---|---|---|---|
| WO | | 2020146854 | 7/2020 | |
| WO | WO-2020256623 | A1 * | 12/2020 | H04W 72/042 |

OTHER PUBLICATIONS

3GPP TS 37.213 V16.0.0 (Dec. 2019); Technical Specification; 3rd Generation Partnership Project; Technical Specification Group Radio Access Network; Physical layer procedures for shared spectrum channel access (Release 16).
3GPP TS 38.212 V16.0.0 (Dec. 2019); Technical Specification; 3rd Generation Partnership Project; Technical Specification Group Radio Access Network; NR; Multiplexing and channel coding; (Release 16).
3GPP TS 38.213 V16.0.0 (Dec. 2019); Technical Specification; 3rd Generation Partnership Project; Technical Specification Group Radio Access Network; NR; Physical layer procedures for control (Release 16).
3GPP TS 38.214 V16.0.0 (Dec. 2019); Technical Specification; 3rd Generation Partnership Project; Technical Specification Group Radio Access Network; NR; Physical layer procedures for data; (Release 16).
3GPP TSG-RAN WG2 Meeting #109 R2-20xxxxx; Athens, Greece, Feb. 24-28, 2020; [108#28][R16 RRC] 38331 Rel-16 CR Merge.
3GPP TS 38.331 V15.8.0 (Dec. 2019); Technical Specification; 3rd Generation Partnership Project; Technical Specification Group Radio Access Network; NR; Radio Resource Control (RRC) protocol specification; (Release 15).
3GPP TR 38.889 V16.0.0 (Dec. 2018); Technical Report; 3rd Generation Partnership Project; Technical Specification Group Radio Access Network; Study on NR-based access to unlicensed spectrum (Release 16).
R1-1912090_MTK_Enhancements to HARQ for NR-U operation_final; 3GPP TSG RAN WG1 #99; Reno, USA, Nov. 18-22, 2019; ; Agenda Item:7.2.2.2.3; Source: MediaTek Inc.; Title:Enhancements to HARQ and scheduling for NR-U operation.
R1-1912261_HARQ; 3GPP TSG RAN WG1 #99; Reno, USA, Nov. 18-22, 2019; Agenda item:7.2.2.2.3; Source:Nokia, Nokia Shanghai Bell; Title:Remaining details on NR-U HARQ scheduling and feedback.
R1-1912391 NR-U HARQ_Final; 3GPP TSG RAN WG1 #99; Reno, USA, Nov. 18-22, 2019; Agenda Item:7.2.2.2.3; Source: LG Electronics; Title: HARQ procedure for NR-U.
R1-1912451_NR_U_HARQ; 3GPP TSG RAN WG1 #99; Reno, USA, Nov. 18-22, 2019; Agenda Item:7 2.2.2.3; Source:Samsung; Title:HARQ enhancements for NR-U.
R1-2000311-Remaining issues on HARQ operation for NR-U; 3GPP TSG RAN WG1#100; e-Meeting, Feb. 24-Mar. 6, 2020; Source:vivo; Title:Remaining issues on HARQ operation for NR-U; Agenda Item:7.2.2.2.3.
R1-2000412 Discussion on remaining issues on HARQ enhancement for NR-U; 3GPP TSG RAN WG1 #100R1-2000412; e-Meeting, Feb. 24-Mar. 6, 2020; ; Agenda Item:7.2.2.2.3; Source:Xiaomi; Title:Discussion on remaining issues on HARQ enhancement for NR-U.
R1-2000439_Remaining issues on enhancements to HARQ for NR-U operation_final; 3GPP TSG RAN WG1 #100; e-Meeting, Feb. 24-Mar. 6, 2020; ; Agenda Item:7.2.2.2.3; Source: MediaTek Inc.; Title: Remaining issues on enhancements to HARQ for NR-U operation.
R1-2000472 7.2.2.2.3 Remaining issues on HARQ enhancements; 3GPP TSG RAN WG1 #100-E; Athens, Greece, Feb. 24-28, 2020; ; Source:OPPO; Title:Remaining issues on HARQ enhancements for NR-U ; Agenda Item:7.2.2.2.3.
R1-2000503_HARQ; 3GPP TSG RAN WG1 Meeting #100e ; e-Meeting, Feb. 24-28, 2020; ; Agenda Item:7.2.2.2.3; Source: Nokia, Nokia Shanghai Bell; Title:Remaining issues on NR-U HARQ scheduling and feedback.
R1-2000726—Intel—HARQ for NR-U; 3GPP TSG RAN WG1 Meeting #100-E; e-Meeting, Feb. 24-Mar. 6, 2020; Agenda Itemn:7. 2.2.2.3; Source: Intel Corporation; Title Enhancements to HARQ for NR-unlicensed.
R1-2001043 FL summary_1 for 72223 NRU HARQ; 3GPP TSG RAN WG1 Meeting #100-e; Feb. 24-Mar. 6, 2020; ; Agenda Item:7.2.2.3; Source:Huawei; Title:Feature lead summary#1 on NR-U HARQ and multi-PUSCH scheduling.
R2-1914773 MAC Scheduling Aspects of Multi-TTI Grant; 3GPP TSG RAN WG2 Meeting #108; Reno, NV, USA, Nov. 18-22, 2019; ; Agenda item:6.2.2.7; Source:Qualcomm Incorporated; Title:MAC Scheduling Aspects of Multi-TTI Grant.
R2-1915103; 3GPP TSG-RAN WG2 Meeting #108; Reno, USA, Nov. 18-22, 2019; Resubmission of R2-1912662; Agenda item:6. 2.2.7; Source:Lenovo, Motorola Mobility; Title:LBT impact to Multi-PUSCH scheduling.
R2-2001343 108#75 NR-U MAC open issues; 3GPP TSG-RAN WG2 Meeting #109e; Electronic meeting, Feb. 24 to Mar. 6, 2020; Agenda Item:6.2.1; Source:Ericsson (rapporteur); Title:Summary of open issues for NR-U Running 38.321; Document for Discussion, Decision.
RAN1 #95 1811; Study on NR-based Access to Unlicensed Spectrum; FS_NR_unlic; SID in RP-181339. Please refer to the SID for detailed scoping R1-1813847 Chairman's notes of AI 7.2.2 Study on NR-based Access to Unlicensed Spectrum Ad-Hoc Chair (Ericsson) Contents incorporated below and endorsed with updates.
RAN2#105 1902; 11.2 NR-based Access to Unlicensed Spectrum; (NR_unlic-Core; leading WG: RAN1; REL-16; started: Dec. 18; target; Dec. 19; WID: RP-182878) Time budget: 1 TU Documents in this agenda item will be handled in a break out session Running CR;—Rapporteur explains that there will be a running CR to capture agreements.

* cited by examiner

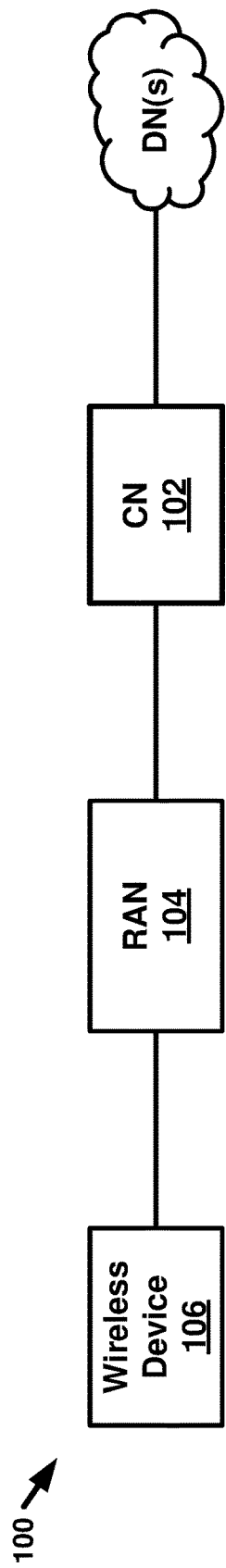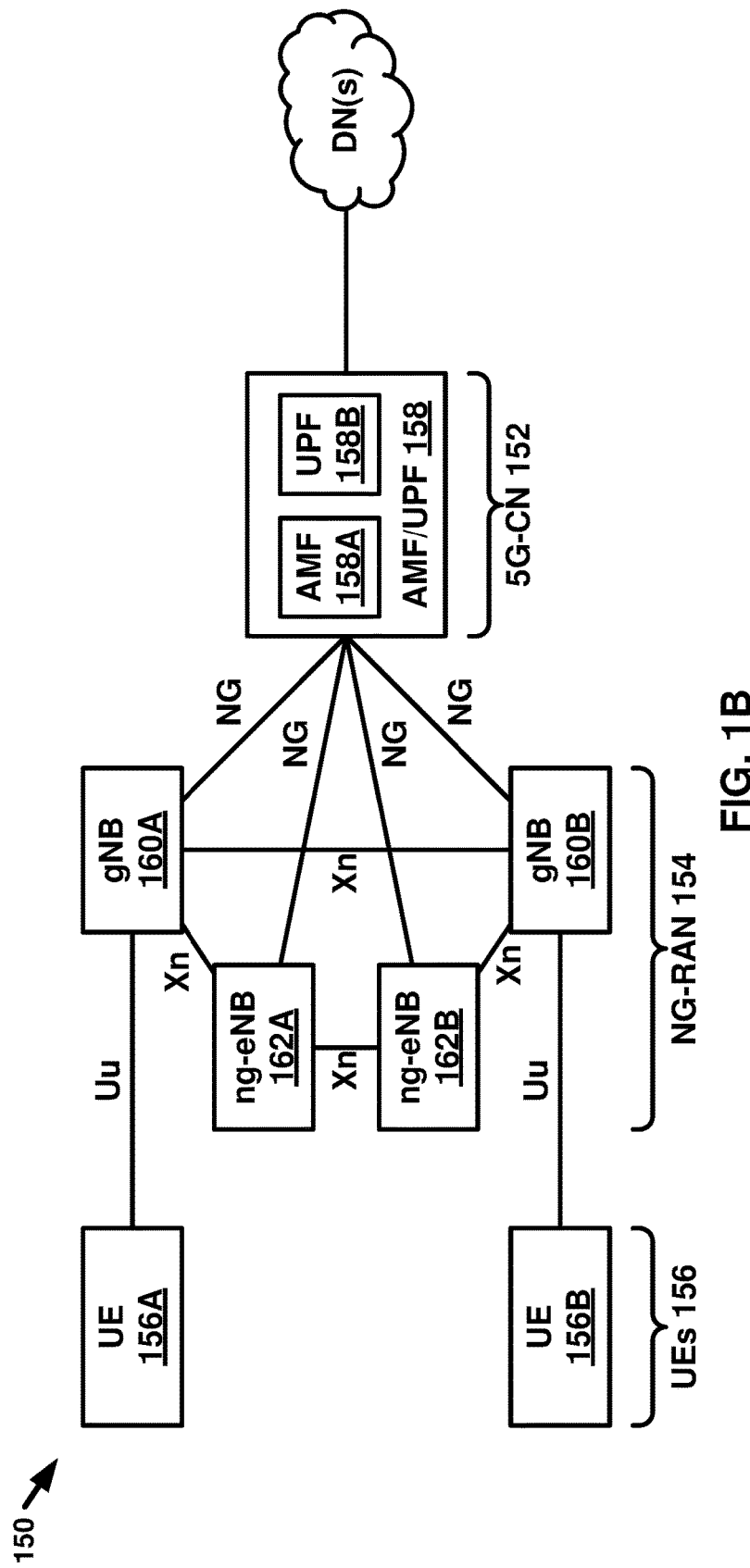

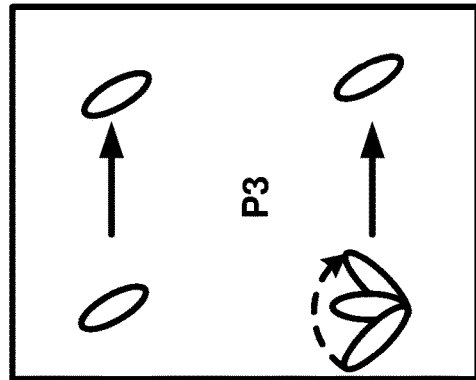
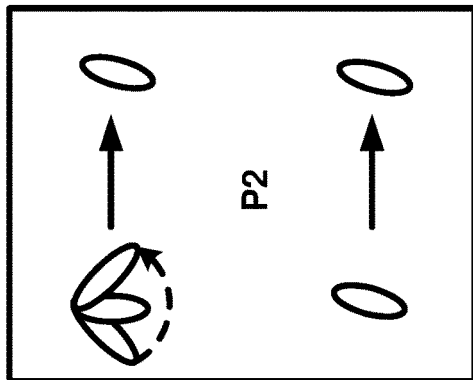
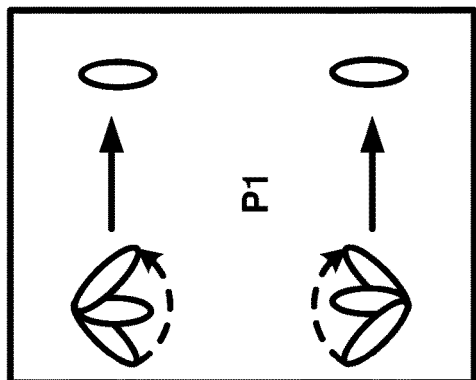
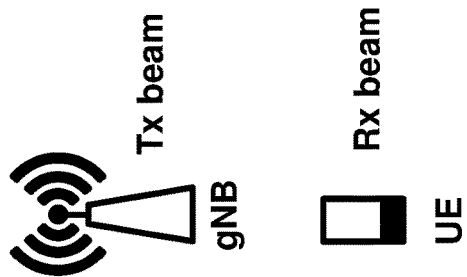
FIG. 12A
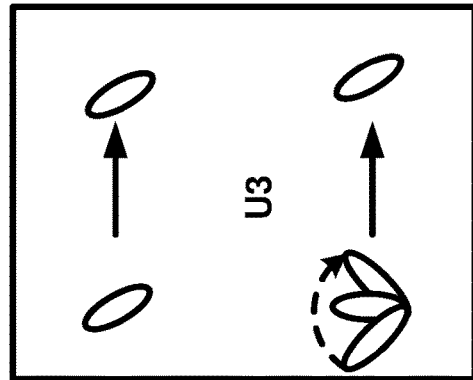
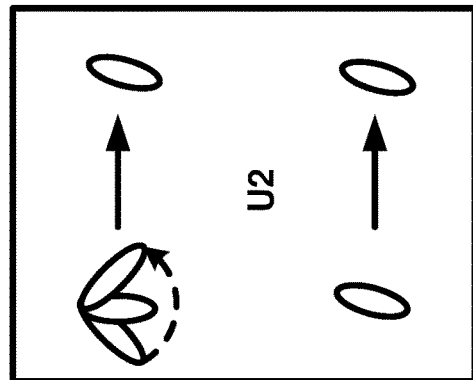
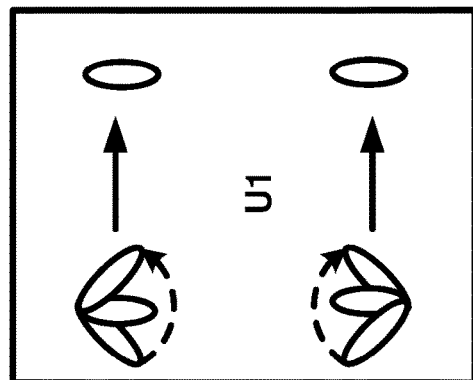
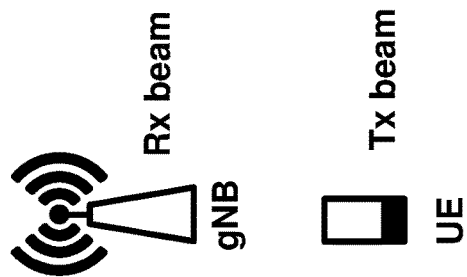
FIG. 12B

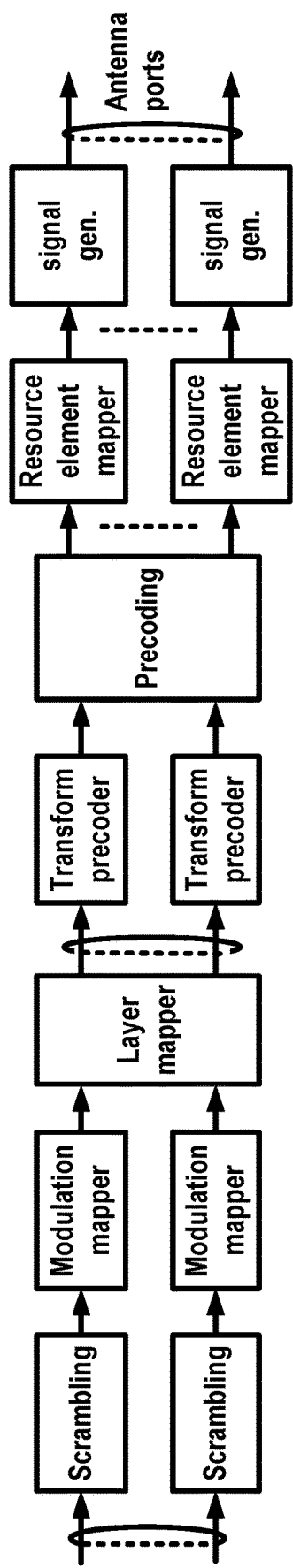
FIG. 16A
FIG. 16B
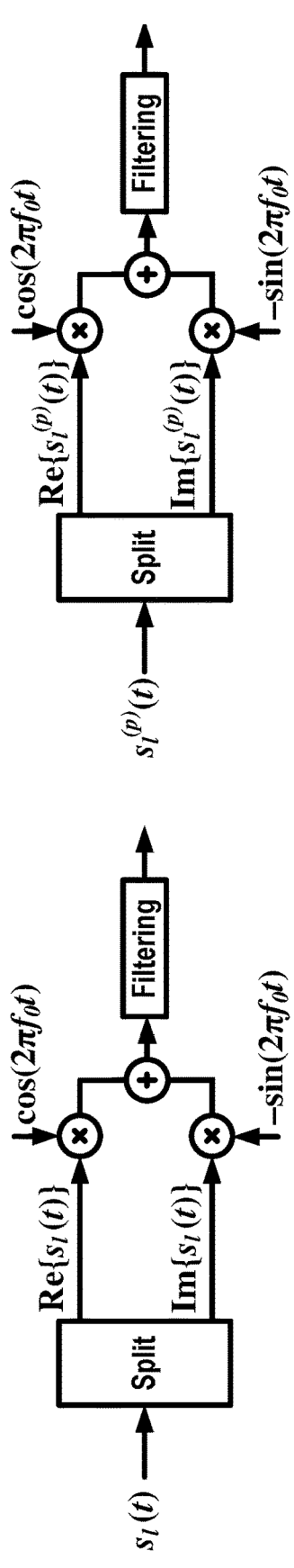
FIG. 16D
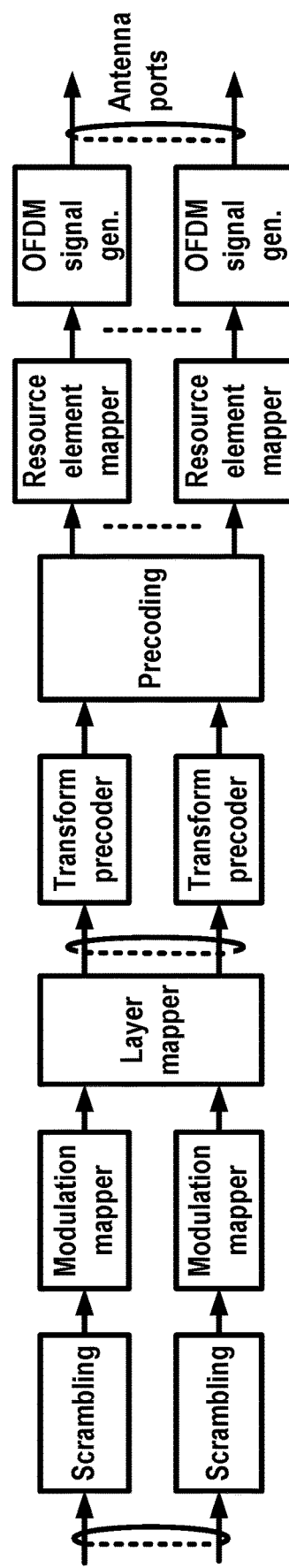
FIG. 16C

HARQ FEEDBACK COLLISION IN UNLICENSED BANDS

CROSS-REFERENCE TO RELATED APPLICATIONS

This application claims the benefit of U.S. Provisional Application No. 63/007,853, filed on Apr. 9, 2020, the entire contents of which is hereby incorporated by reference in their entireties.

BRIEF DESCRIPTION OF THE DRAWINGS

Examples of several of the various embodiments of the present disclosure are described herein with reference to the drawings.

FIG. 1A and FIG. 1B illustrate example mobile communication networks in which embodiments of the present disclosure may be implemented.

FIG. 12A and FIG. 12B respectively illustrate examples of three downlink and uplink beam management procedures.

FIG. 16A, FIG. 16B, FIG. 16C, and FIG. 16D illustrate example structures for uplink and downlink transmission.

DETAILED DESCRIPTION

Figure 2A:
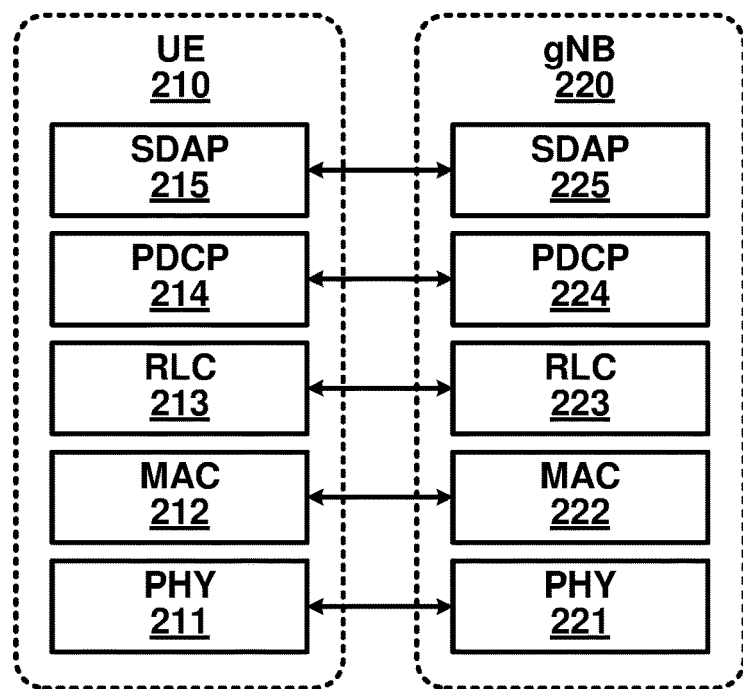
FIG. 2A and FIG. 2B respectively illustrate a New Radio (NR) user plane and control plane protocol stack.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNs), such as public DNs (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNs (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QoS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2B:
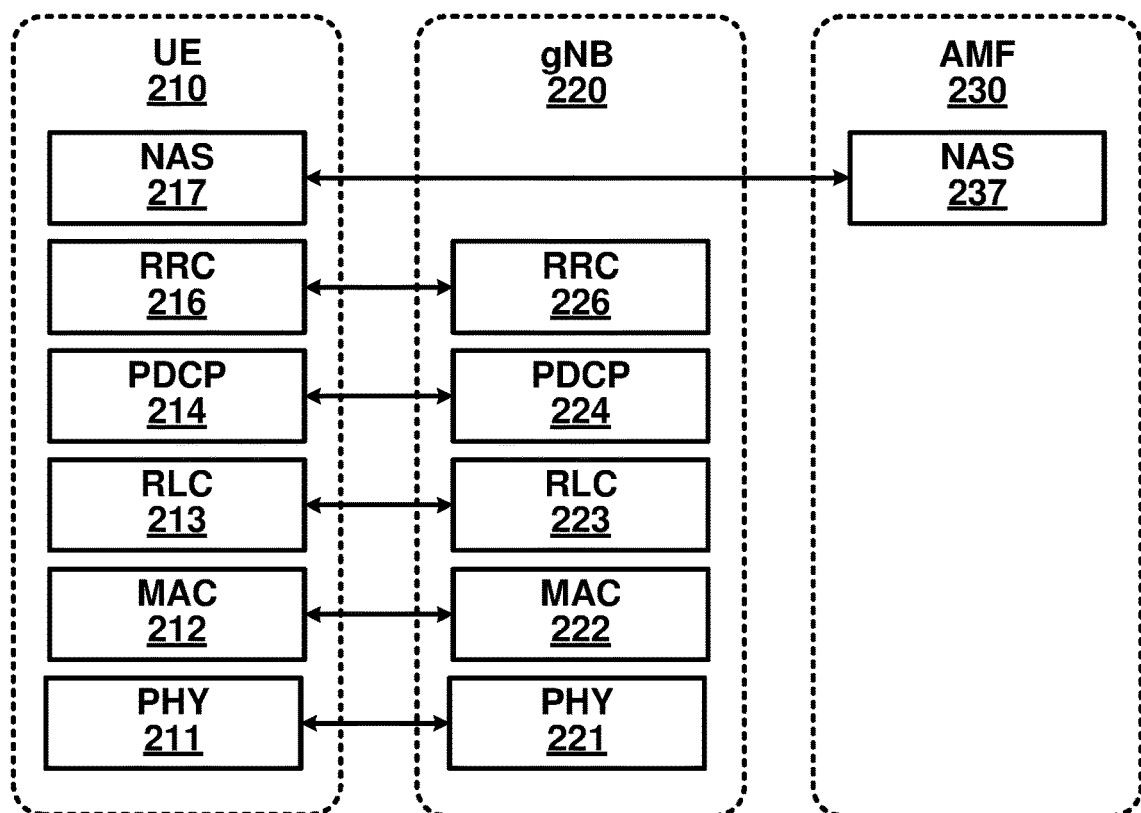

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
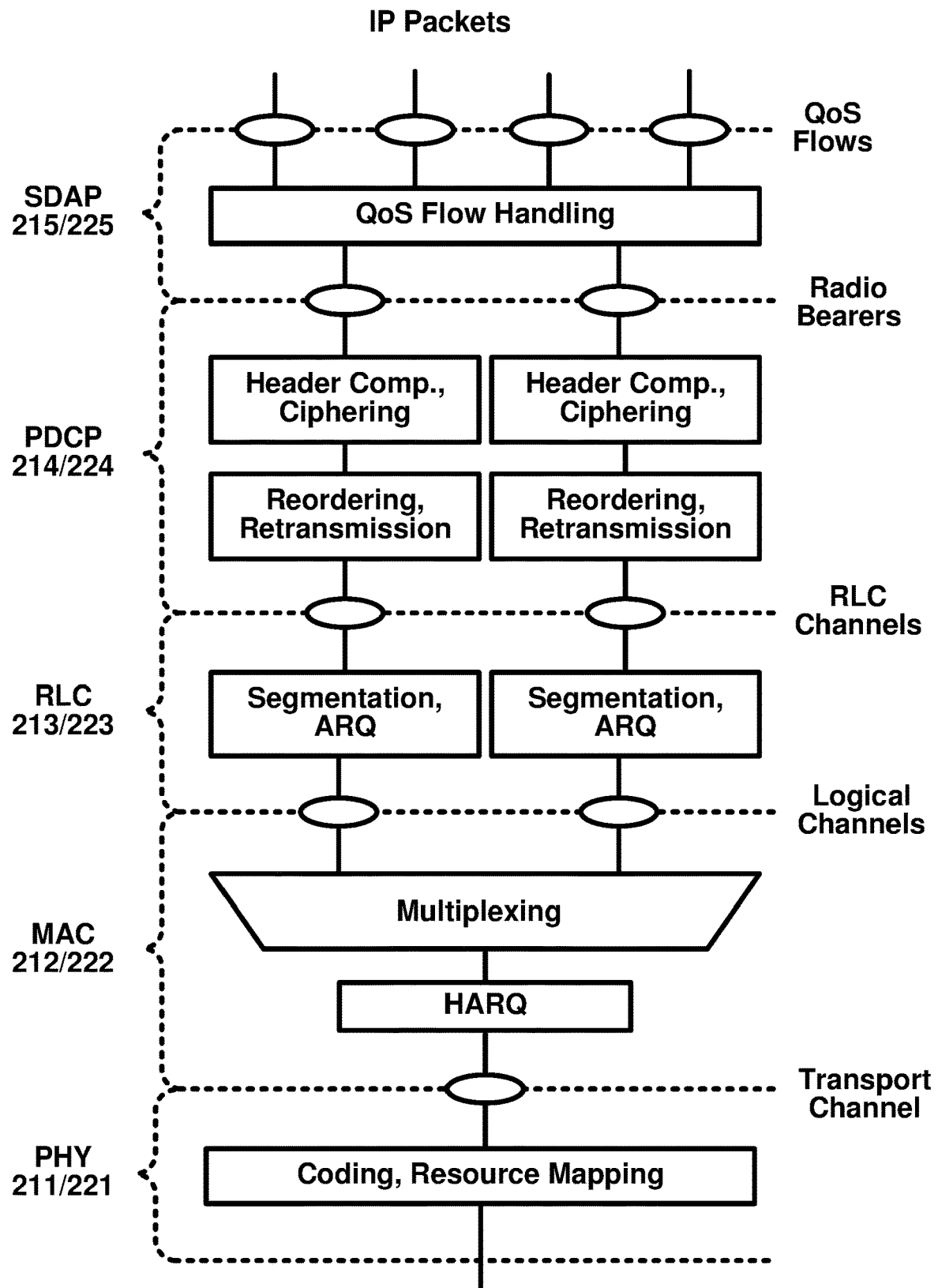
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figures 4A, 4B:
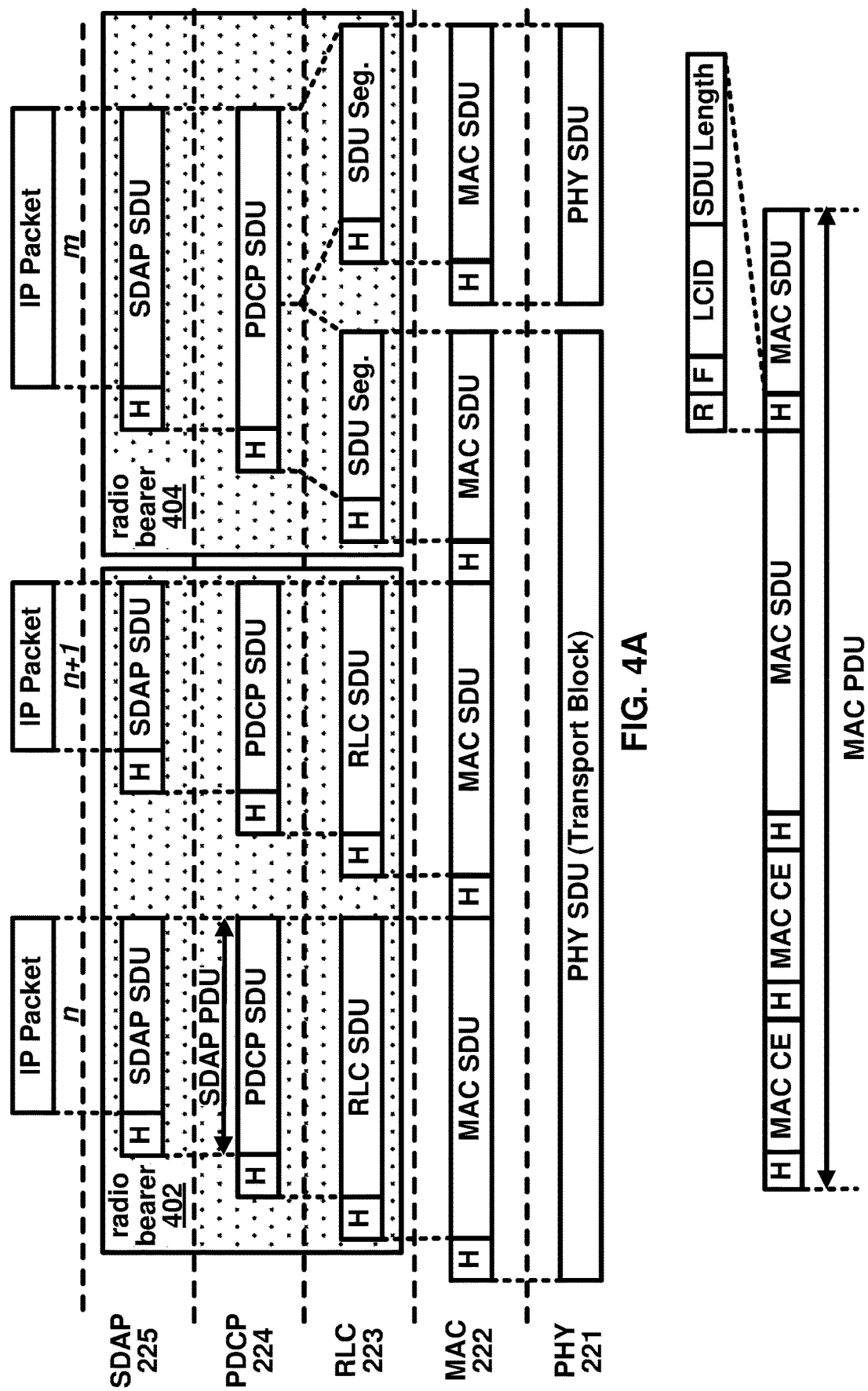
FIG. 4A illustrates an example downlink data flow through the NR user plane protocol stack of FIG. 2A.
FIG. 4B illustrates an example format of a MAC subheader in a MAC PDU.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

Figure 5B:
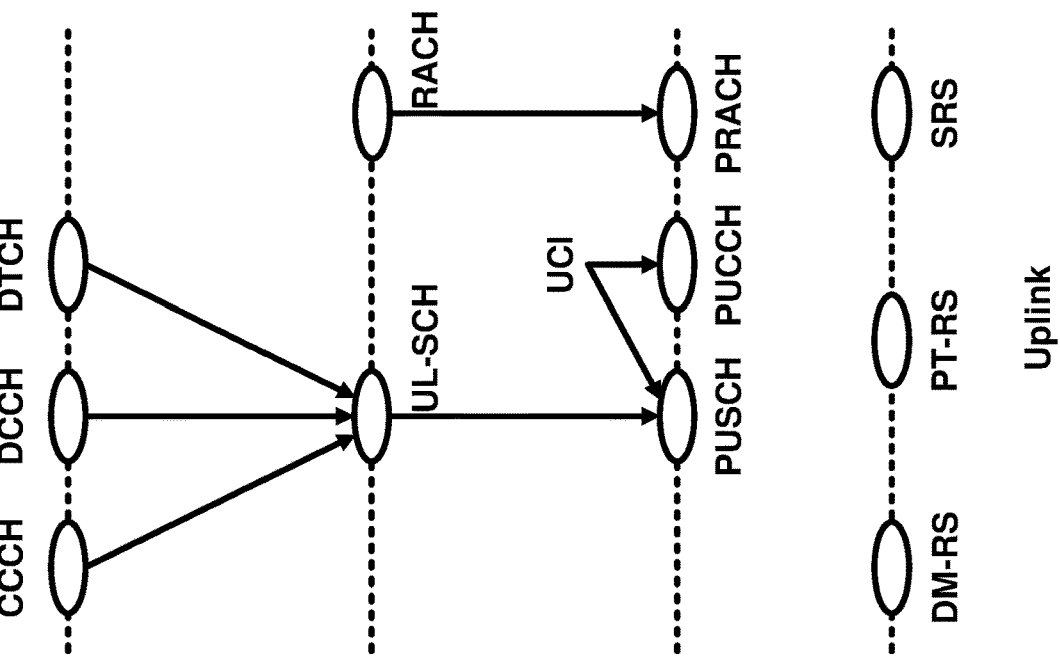
FIG. 5A and FIG. 5B respectively illustrate a mapping between logical channels, transport channels, and physical channels for the downlink and uplink.
Figure 5A:
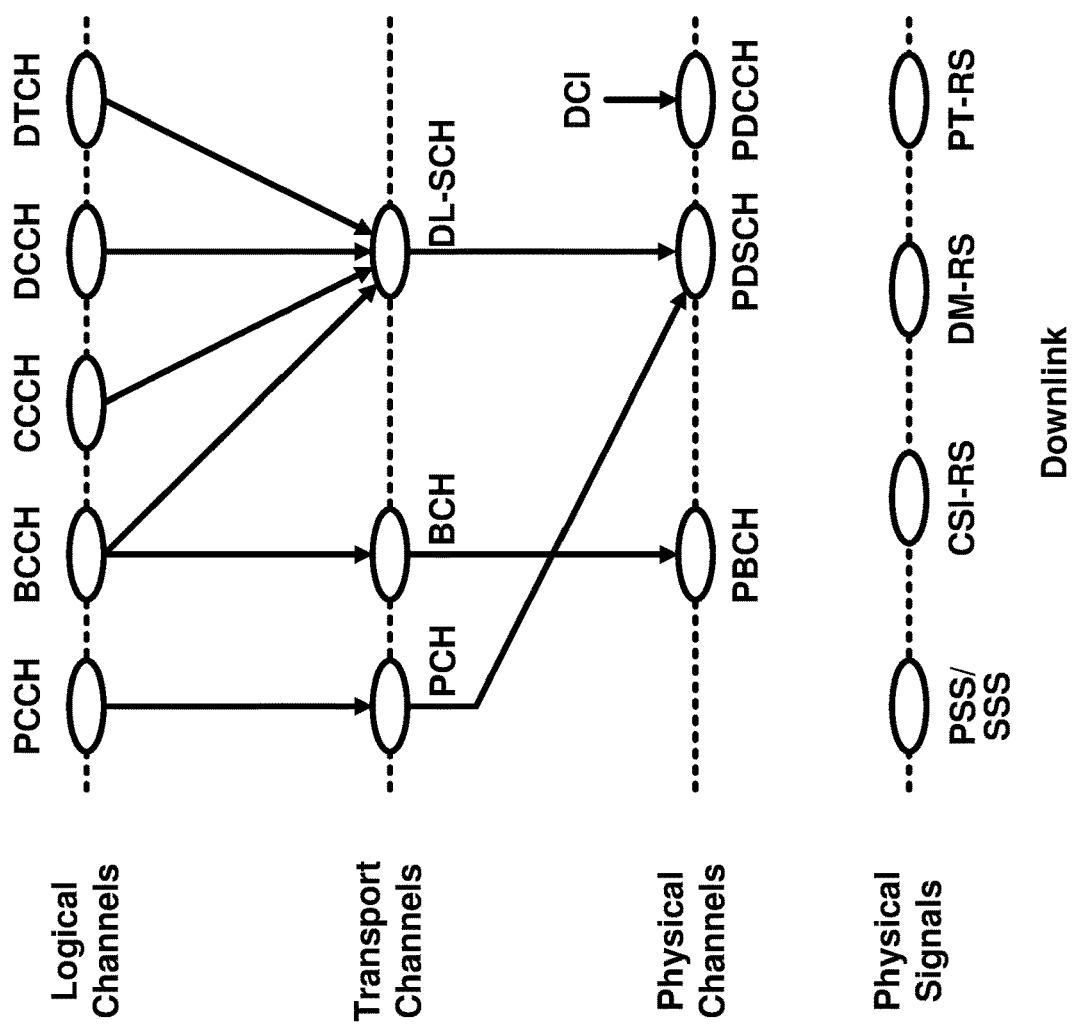

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:

a paging control channel (PCCH) for carrying paging messages used to page a UE whose location is not known to the network on a cell level;

a broadcast control channel (BCCH) for carrying system information messages in the form of a master information block (MIB) and several system information blocks (SIBs), wherein the system information messages may be used by the UEs to obtain information about how a cell is configured and how to operate within the cell;

a common control channel (CCCH) for carrying control messages together with random access;

a dedicated control channel (DCCH) for carrying control messages to/from a specific the UE to configure the UE; and a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:

a paging channel (PCH) for carrying paging messages that originated from the PCCH;

a broadcast channel (BCH) for carrying the MIB from the BCCH;

a downlink shared channel (DL-SCH) for carrying downlink data and signaling messages, including the SIBs from the BCCH;

an uplink shared channel (UL-SCH) for carrying uplink data and signaling messages; and a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

a physical broadcast channel (PBCH) for carrying the MIB from the BCH;

a physical downlink shared channel (PDSCH) for carrying downlink data and signaling messages from the DL-SCH, as well as paging messages from the PCH;

a physical downlink control channel (PDCCH) for carrying downlink control information (DCI), which may include downlink scheduling commands, uplink scheduling grants, and uplink power control commands;

a physical uplink shared channel (PUSCH) for carrying uplink data and signaling messages from the UL-SCH and in some instances uplink control information (UCI) as described below;

a physical uplink control channel (PUCCH) for carrying UCI, which may include HARQ acknowledgments, channel quality indicators (CQI), pre-coding matrix indicators (PMI), rank indicators (RI), and scheduling requests (SR); and a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
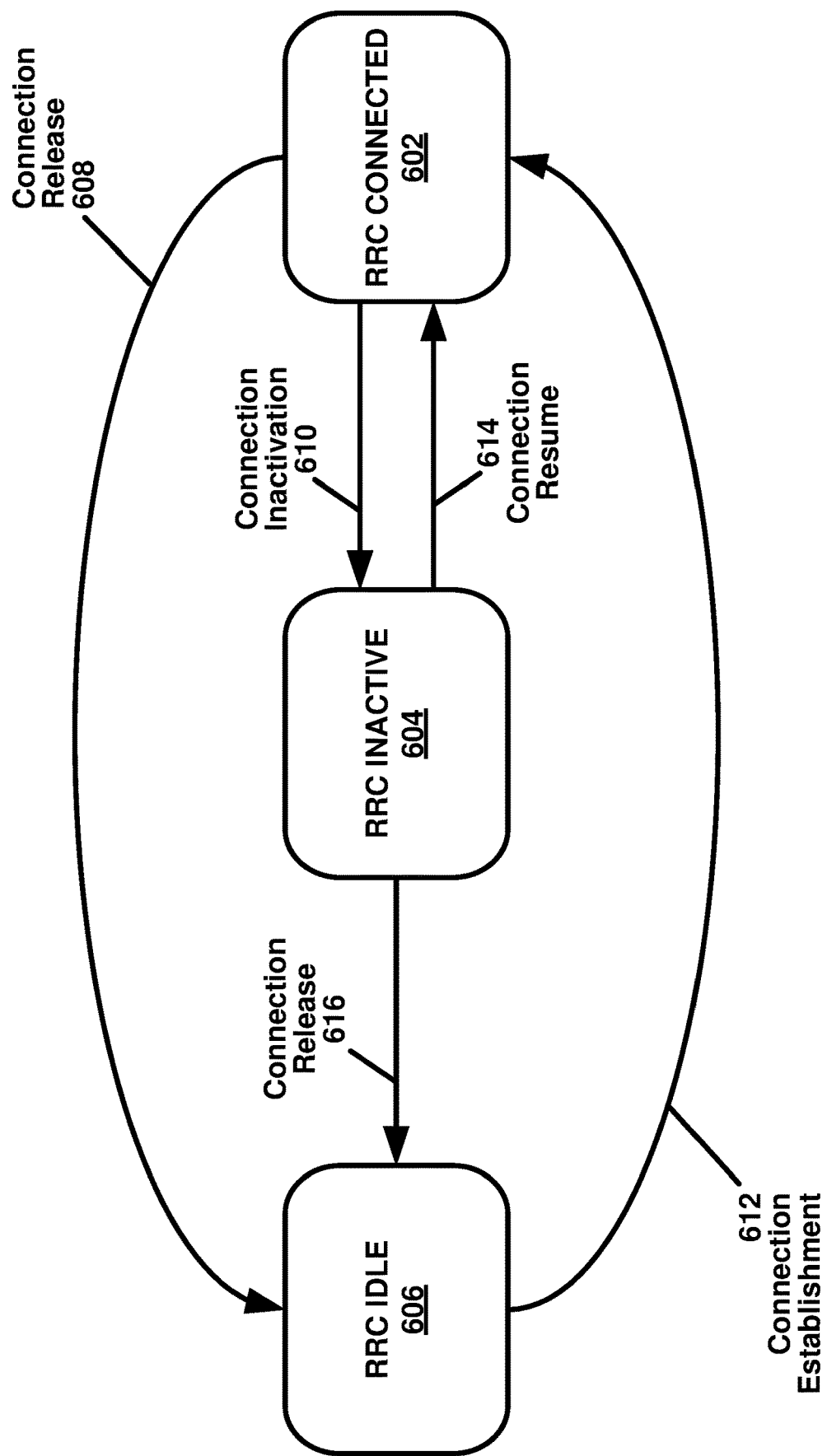
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
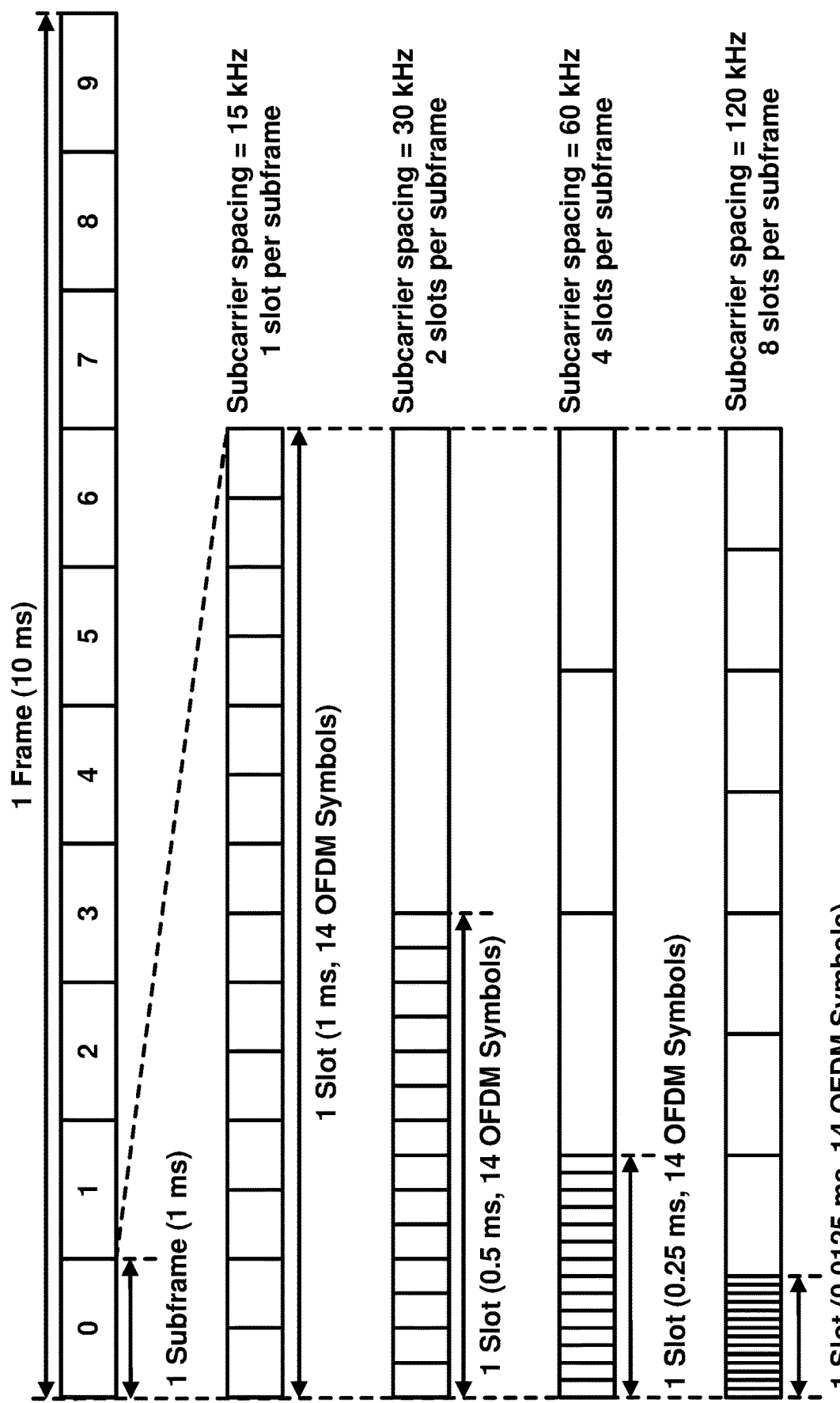
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 µs. For example, NR defines numerologies with the following subcarrier spacing/cyclic prefix duration combinations: 15 kHz/4.7 µs; 30 kHz/2.3 µs; 60 kHz/1.2 µs; 120 kHz/0.59 µs; and 240 kHz/0.29 µs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 kHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
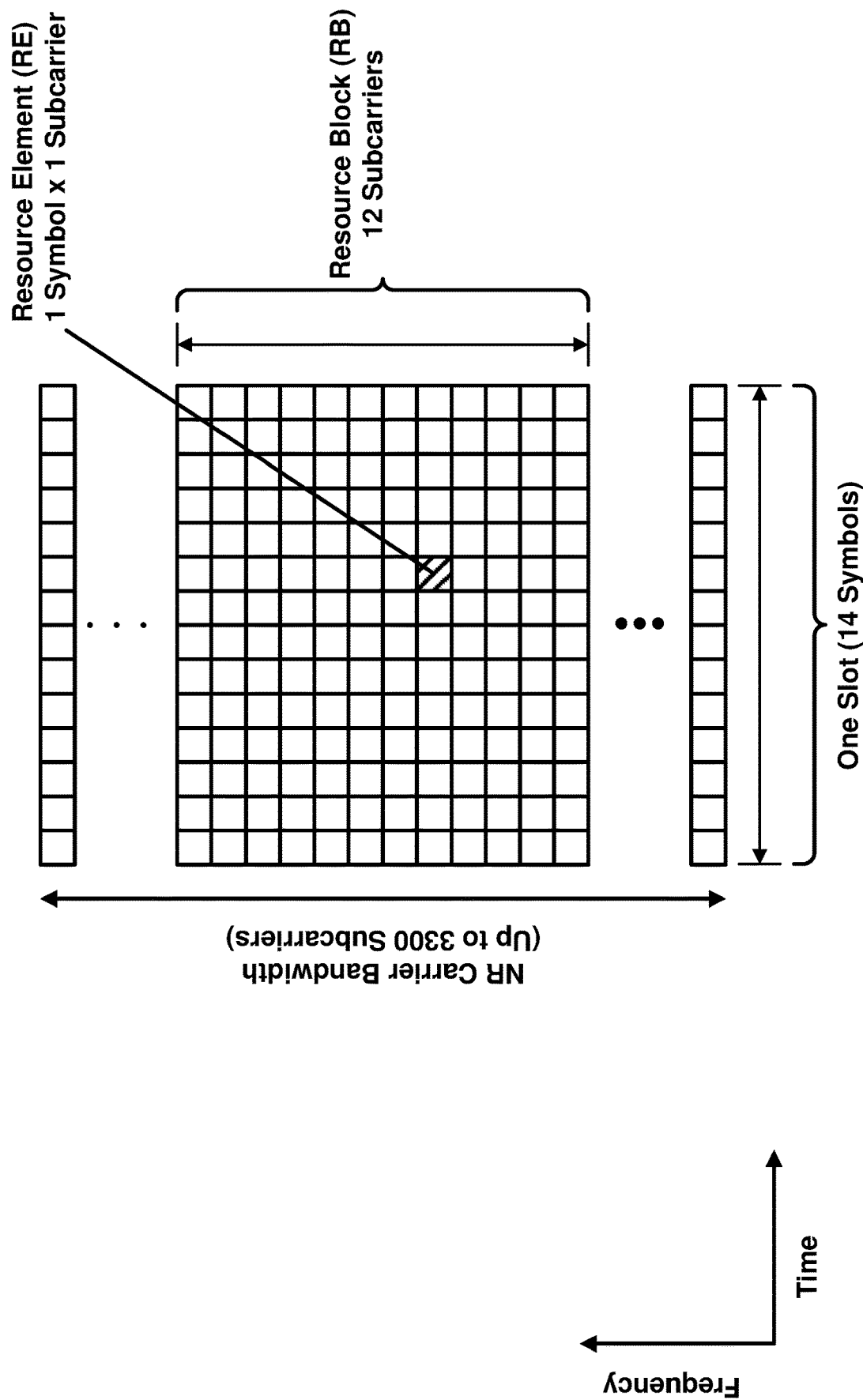
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
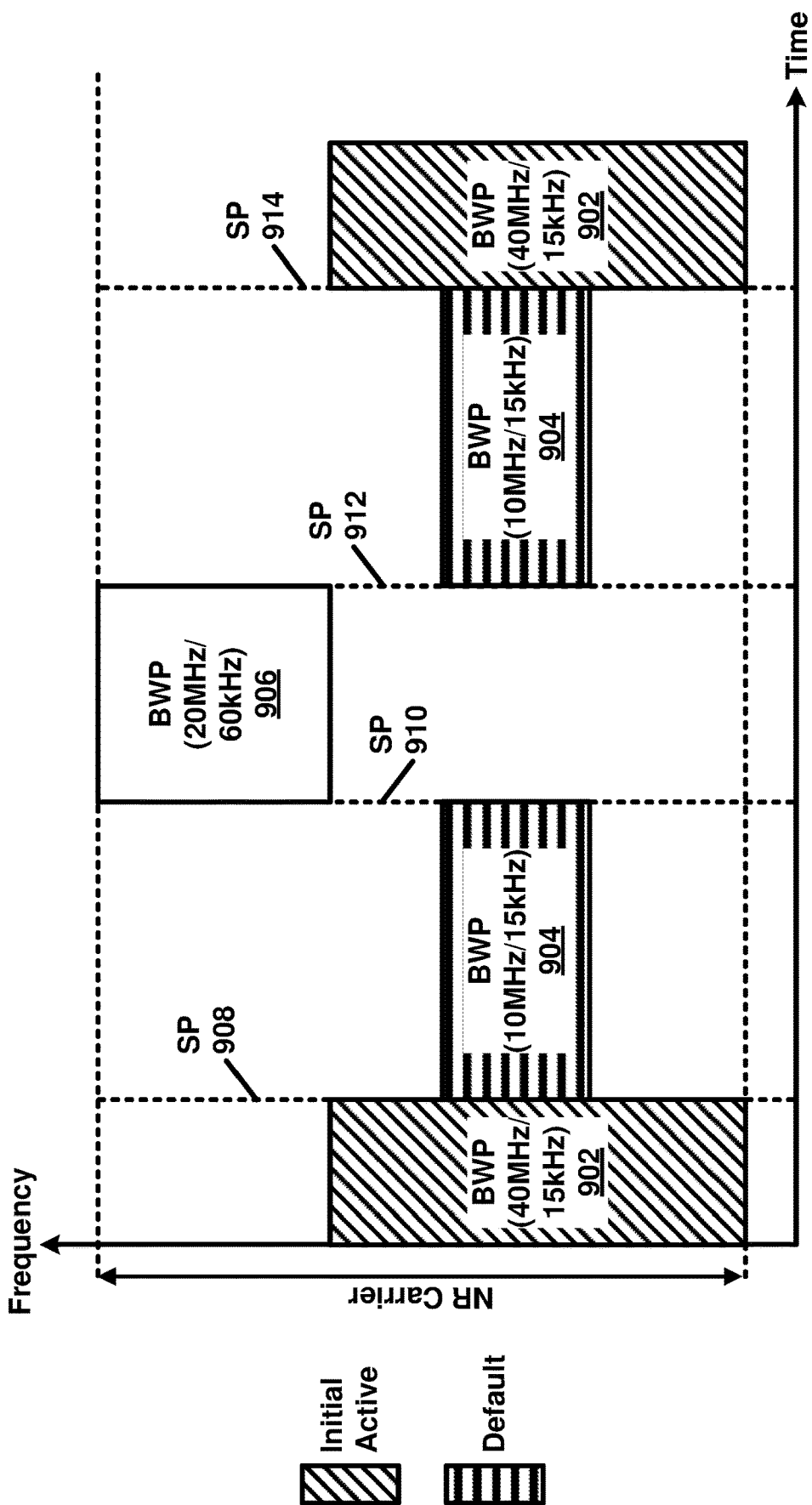
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 kHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE would use these values for a primary cell.

To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
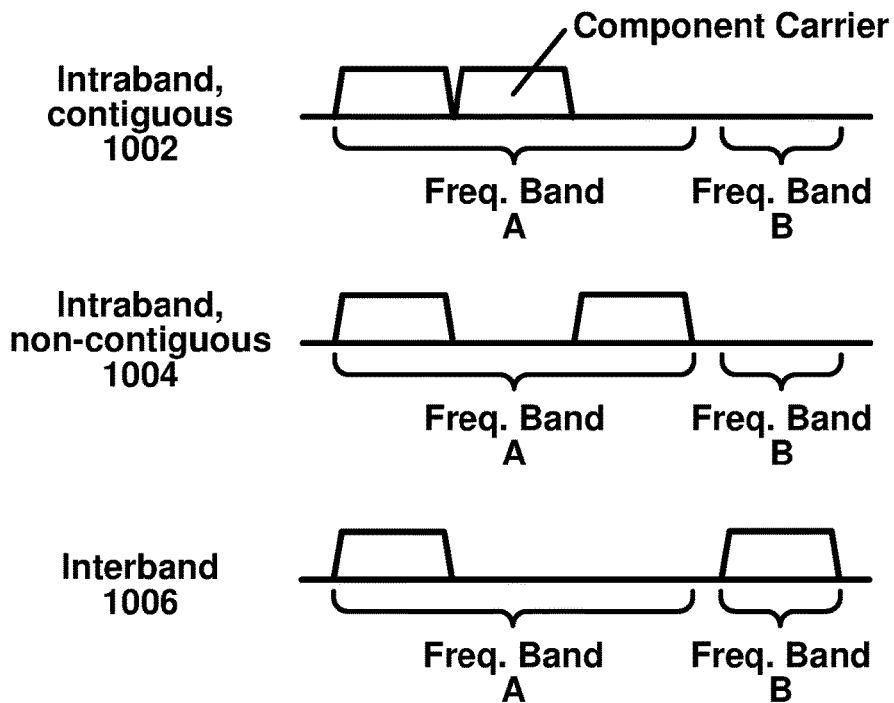
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
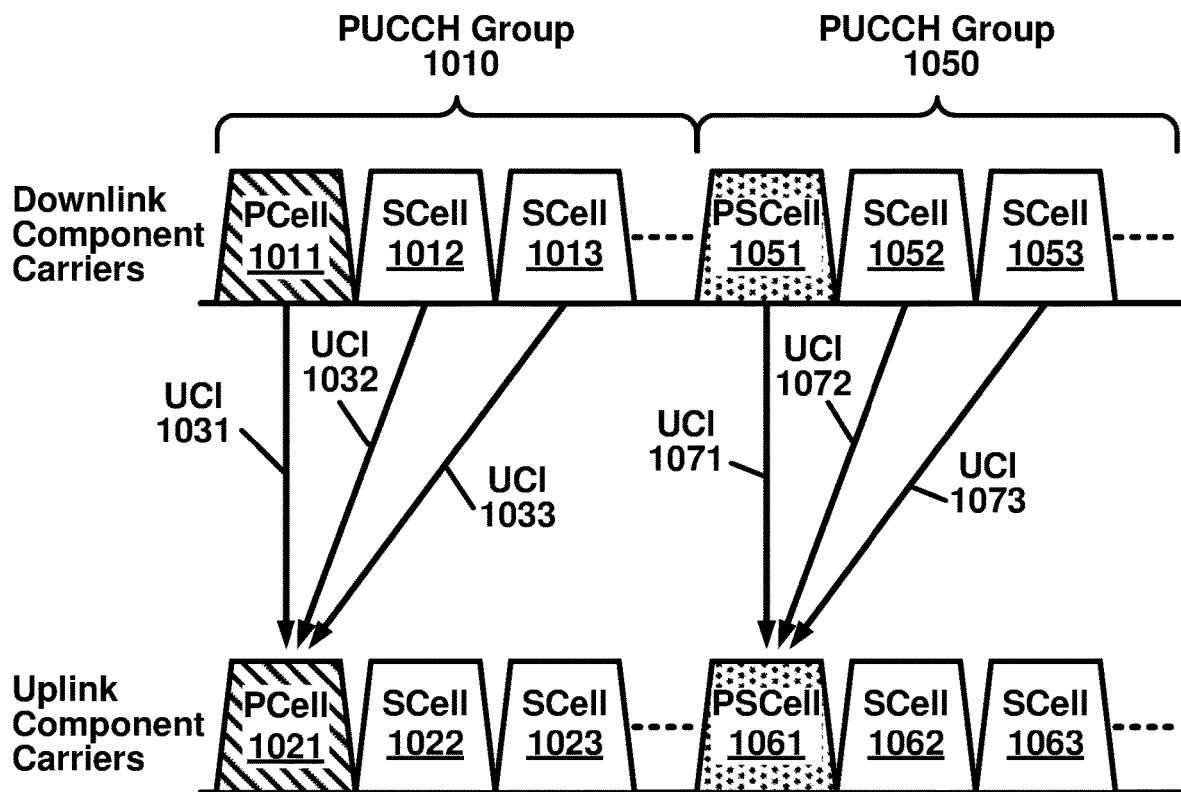
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary Scell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
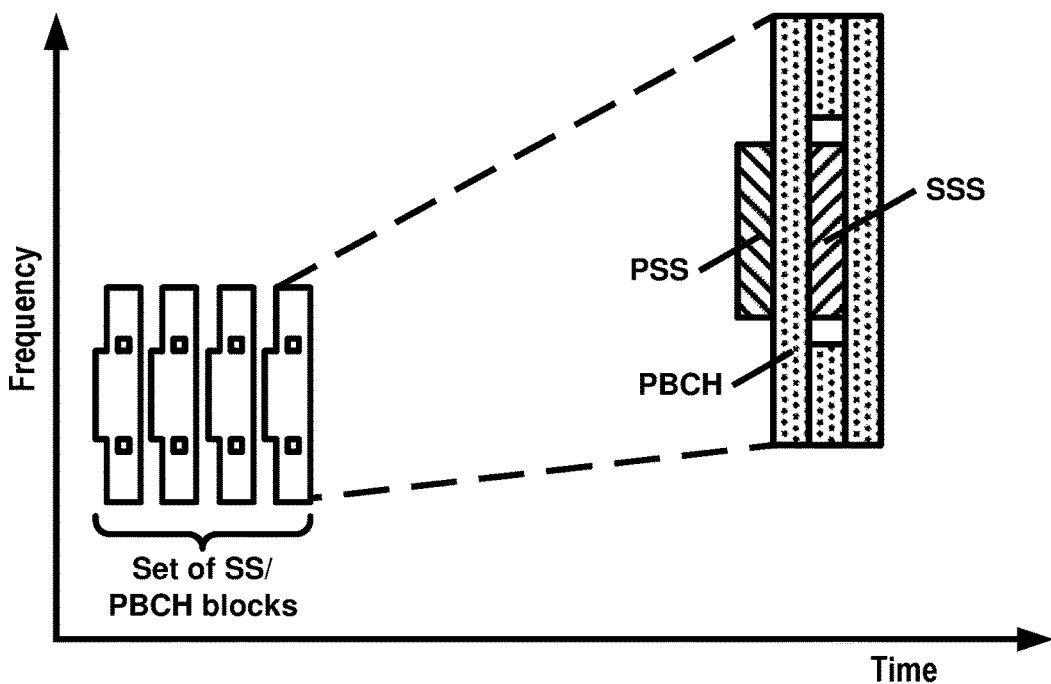
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS)), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
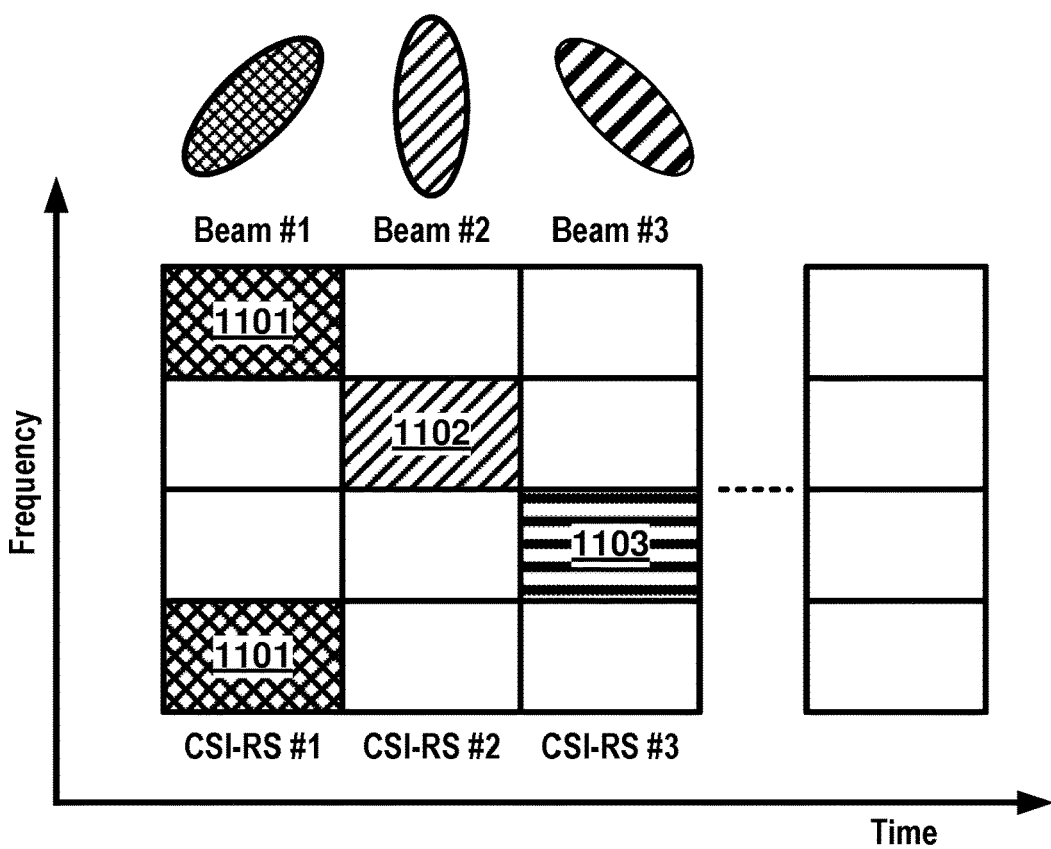
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
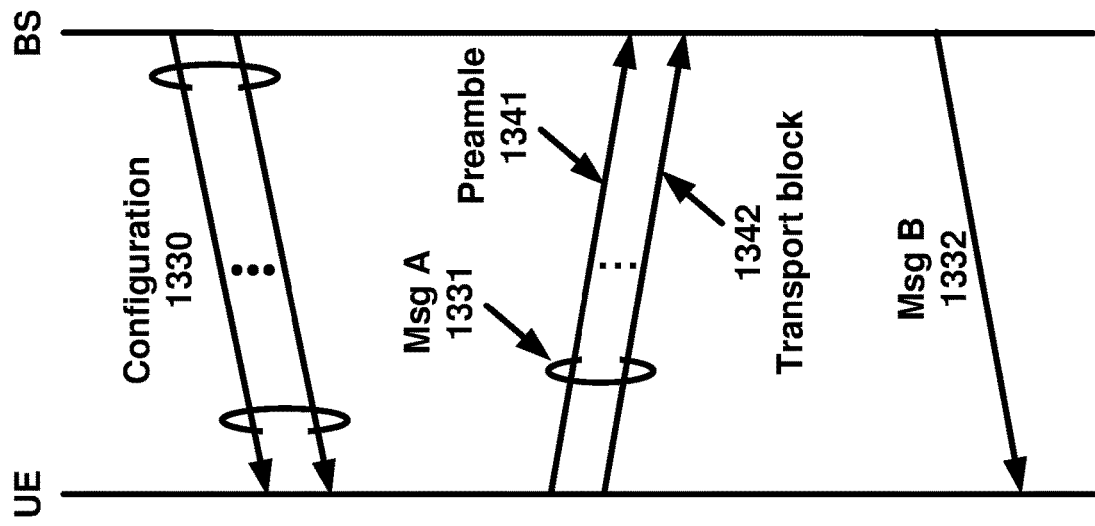
FIG. 13A, FIG. 13B, and FIG. 13C respectively illustrate a four-step contention-based random access procedure, a two-step contention-free random access procedure, and another two-step random access procedure.
Figure 13B:
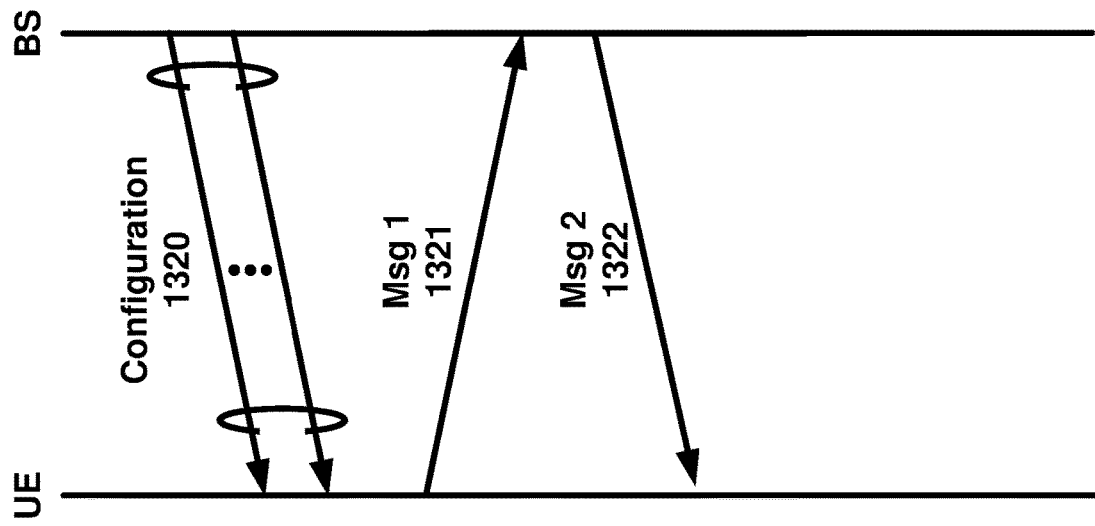
Figure 13A:
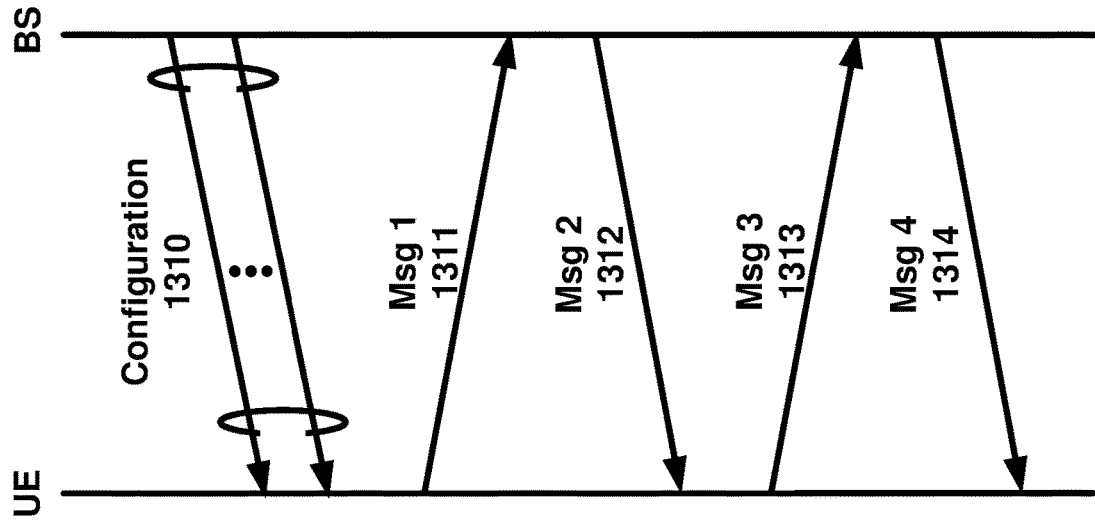

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

$$RA\text{-}RNTI = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI)). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
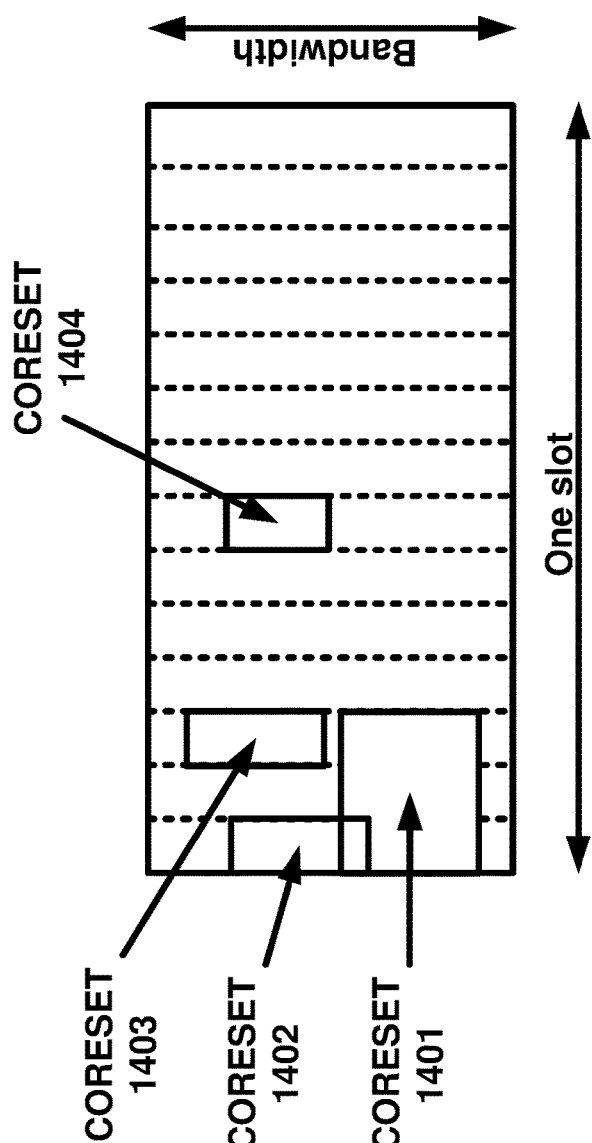
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
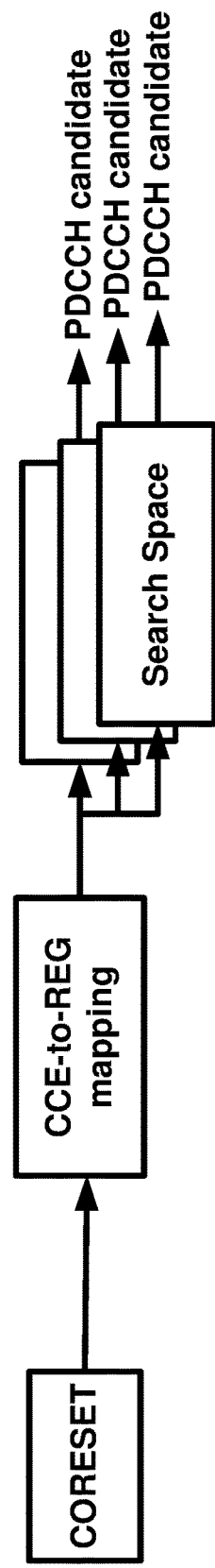
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI)) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "31".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
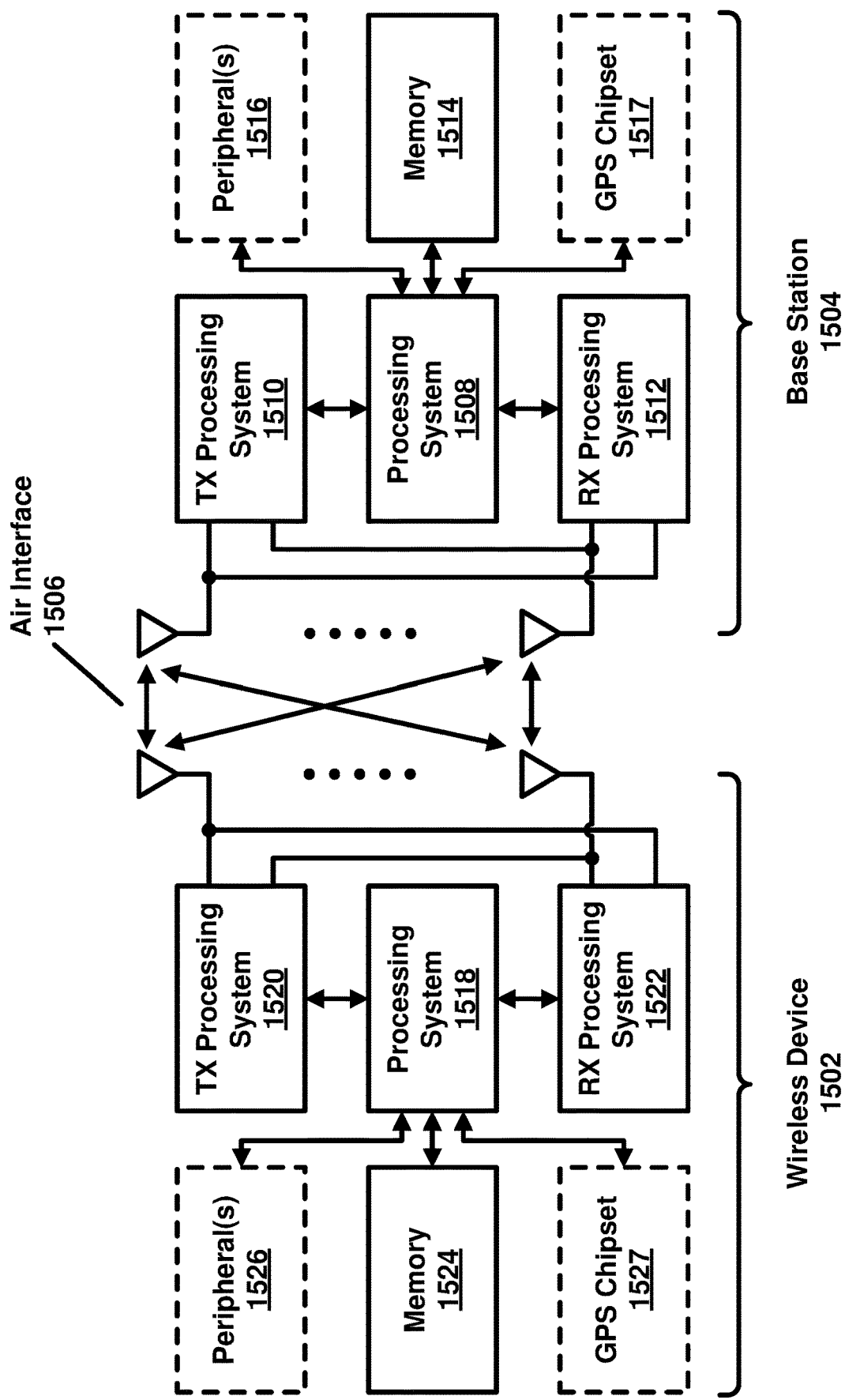
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

The hybrid-ARQ (hybrid automatic repeat request, HARQ) mechanism in the MAC layer targets very fast transmissions. A wireless device may provide feedback on success (e.g., an ACK) or failure (e.g., a NACK) of a downlink transmission (e.g., a PDSCH) to a base station for each scheduled/candidate transport block. It may be possible to attain a very low error rate probability of the HARQ feedback, which may come at a cost in transmission resources such as power. For example, a feedback error rate of 0.1-1% may be reasonable, which may result in a HARQ residual error rate of a similar order. This residual error rate may be sufficiently low in many cases. In some services requiring ultra-reliable delivery of data with low latency, e.g., URLLC, this residual error rate may not be tolerable. In such cases, the feedback error rate may be decreased and an increased cost in feedback signaling may be accepted, and/or additional retransmissions may be performed without relying on feedback signaling, which comes at a decreased spectral efficiency.

HARQ protocol may be a primary way of handling retransmissions in a wireless technology, e.g., NR. In case of an erroneously received packet, a retransmission may be required. Despite it not being possible to decode the packet, a received signal may still contain information, which may be lost by discarding the erroneously received packet. HARQ protocol with soft combining may address this shortcoming. In HARQ with soft combining, the wireless device may store the erroneously received packet in a buffer memory, and later combine the received packet with one or more retransmissions to obtain a single, combined packet/transport block that may be more reliable than its constituents. Decoding of the error-correction code operates on the combined signal. Retransmissions of codeblock groups that form a transport block may be handled by the physical layer and/or MAC layer.

The HARQ mechanism typically comprises multiple stop-and-wait protocols, each operating on a single transport block. In a stop-and-wait protocol, a transmitter stops and waits for an acknowledgment after each transmitted transport block. This protocol requires a single bit indicating positive or negative acknowledgment of the transport block; however, the throughput is low due to waiting after each transmission. Multiple stop-and-wait processes may operate in parallel, e.g., while waiting for acknowledgment from one HARQ process, the transmitter may transmit data of another HARQ process. The multiple parallel HARQ processes may form a HARQ entity, allowing continuous transmission of data. A wireless device may have one HARQ entity per carrier. A HARQ entity may support spatial multiplexing of more than four layers to a single device in the downlink, where two transport blocks may be transmitted in parallel on the same transport channel. The HARQ entity may have two sets of HARQ processes with independent HARQ acknowledgments.

A wireless technology may use an asynchronous HARQ protocol in the downlink and/or uplink, e.g., the HARQ process which the downlink and/or uplink transmission relates to, may be explicitly and/or implicitly signaled. For example, the downlink control information (DCI) scheduling a downlink transmission may signal the corresponding HARQ process. Asynchronous HARQ operation may allow dynamic TDD operation, and may be more efficient when operating in unlicensed spectra, where it may not possible to guarantee that scheduled radio resources are available at the time for synchronous retransmissions.

Large transport block sizes may be segmented into multiple codeblocks prior to coding, each with its own CRC, in addition to an overall TB CRC. Errors may be detected on individual codeblocks based on their CRC, as well as on the overall TB. The base station may configure the wireless device with retransmissions based on groups of codeblocks, e.g., codeblock groups (CBGs). If per-CBG retransmission is configured, feedback is provided pre CBG. A TB may comprise of one or more CBGs. A CBG that a codeblock belongs to may be determined based on an initial transmission and may be fixed.

In the downlink, retransmissions may be scheduled in a same way as new data. For example, retransmissions may be scheduled at any time and any frequency location within a downlink cell and/or an active downlink BWP of a cell. A downlink scheduling assignment may contain necessary HARQ-related control signaling, e.g., HARQ process number; new-data indicator (NDI); CBG transmit indicator (CBGTI) and CBG flush indicator (CBGFI) in case per-CBG retransmission is configured; and/or information to schedule the transmission of the acknowledgment (ACK/NACK) in an uplink (e.g., a PUCCH), such as timing and resource indication information.

Upon receiving a downlink scheduling assignment in the DCI, the wireless device tries to decode the TB, e.g., after soft combining with previous attempts/receptions of the TB. Transmissions and retransmissions may be scheduled in a same framework. The wireless device may determine whether the transmission is a new transmission or a retransmission based on the NDI field in the DCI. An explicit NDI may be included for the scheduled TB as part of the scheduling information in the downlink. The NDI field may comprise one or more NDI bits per TB (and/or CBG). An NDI bit may be toggled for a new transmission, and not toggled for a retransmission. In case of a new transmission, the wireless device flushes soft buffer corresponding to the new transmission before receiving/storing the new transmission. In case of a retransmission, the wireless device may perform a soft combining of the received data with stored data in the soft buffer for the corresponding HARQ process based on the downlink scheduling assignment.

A time gap/interval/offset (e.g., K1) from a downlink data reception/resource to a transmission of a HARQ ACK/NACK corresponding to the downlink data may be fixed, e.g., multiple subframes/slots/symbols (e.g., three ms, 4 slots). This scheme with pre-defined timing instants for ACK/NACK may not blend well with dynamic TDD and/or unlicensed operation. A more flexible scheme, capable of dynamically controlling the ACK/NACK transmission timing may be adopted. For example, a DL scheduling DCI may comprise a PDSCH-to-HARQ_feedback timing field to control/indicate the transmission timing of an ACK/NACK corresponding to a data scheduled by the DL scheduling DCI in an uplink transmission (e.g., PUCCH). The PDSCH-to-HARQ_feedback timing field in the DCI may be used as an index of one or more indexes of K1 values in a pre-defined and/or RRC-configured table (e.g., a HARQ timing table). The K1 value may provide information of a gap/interval/offset between a second time to transmit the HARQ ACK/NACK relative to a first time of the reception of data (e.g., physical DL shared channel (PDSCH)).

Figure 17:
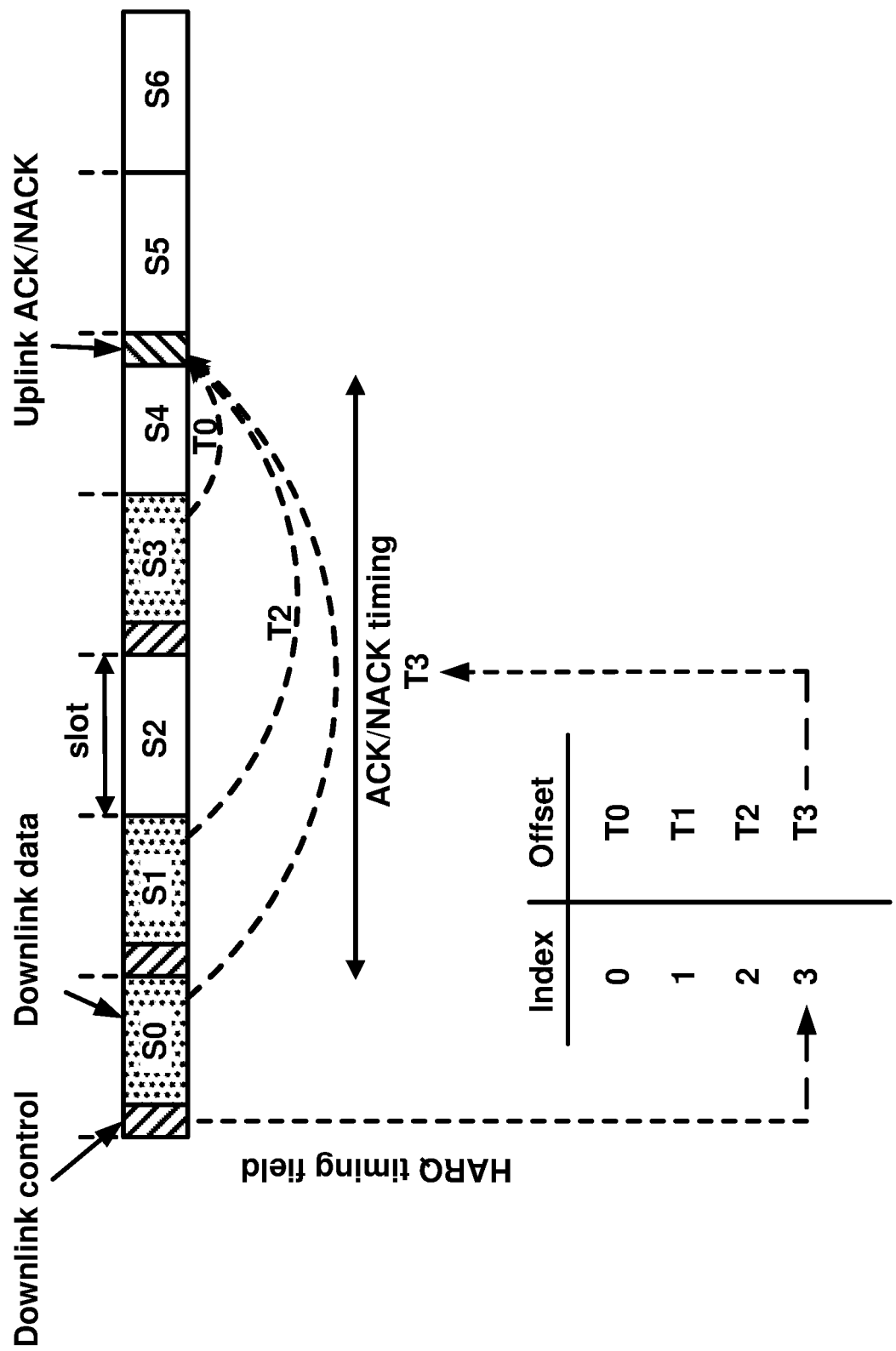
FIG. 17 illustrates an example of HARQ acknowledgment timing determination, according to some embodiments of the present disclosure.

FIG. 17 shows an example of HARQ feedback timing determination, according to some embodiments. In this example, three DCIs are received in slots S0, S1, and S3 that schedule three downlink assignments in the same slots. In each downlink assignment, different HARQ feedback timing indices are indicated, e.g., in S0: 3, in S1: 2, and in S3: 0. The indicated indices (PDSCH-to-HARQ_feedback timing field) point to the HARQ timing table, e.g., for S0: T3 in indicated that points to S4 for transmission of the uplink ACK/NACK, for S1: T2 in indicated that points to S4 for transmission of the uplink ACK/NACK, for S3: T0 in indicated that points to S4 for transmission of the uplink ACK/NACK. As a result, all three downlink assignments are acknowledged in the same slot, S4. The wireless device multiplexes the three acknowledgments and transmits the three acknowledgements in slot S4.

A wireless devices may support a baseline processing time/capability. Some wireless devices may support additional aggressive/faster processing time/capability. A wireless device may report to a base station a processing capability, e.g. per sub-carrier spacing.

A wireless device may determine a resource for HARQ ACK/NACK transmission, e.g. frequency resource and/or PUCCH format and/or code domain, based on a location of a PDCCH (e.g., a starting control channel element (CCE) index) scheduling the transmission. The scheduling PDCCH/DCI may comprise a field, e.g., PUCCH resource indicator (PRI) field, that indicates a frequency resource for an uplink transmission of the HARQ ACK/NACK transmission. For example, the PRI field may be an index selecting one of a plurality of pre-defined and/or RRC-configured PUCCH resource sets.

A wireless device may multiplex a plurality of HARQ feedback bits that are scheduled for transmission in the uplink at a same time/slot, for example, in a carrier aggregation scenario and/or when per-CBG retransmission is configured. The wireless device may multiplex multiple ACK/NACK bits of multiple TBs and/or CBGs into one multi-bit HARQ feedback message/codebook. The multiple ACK/NACK bits may be multiplexed based on a semi-static codebook and/or a dynamic codebook. A base station, via RRC configuration, may configure either the semi-static codebook or the dynamic codebook for a cell configured with PUCCH resources (e.g., a primary cell, a PUCCH cell)

The semi-static codebook may be viewed as a matrix consisting of a time domain dimension and a component-carrier (and/or CBG and/or MIMO layer) dimension, both of which may be semi-statically configured and/or pre-defined. A size of the time domain dimension may be given by a maximum and/or a minimum HARQ ACK/NACK timing indicated in the pre-defined and/or RRC-configured table of HARQ ACK/NACK timings. A size of the component-carrier domain may be given by a number of simultaneous TBs and/or CBGs across all component carriers. A codebook size may be determined based on the time domain dimension and the component-carrier dimension for a semi-static codebook, regardless of actual scheduled transport blocks/PDSCHs. A number of bits to transmit in a HARQ feedback/report is determined based on one or more RRC configuration parameters. An appropriate format (e.g., PUCCH format) for uplink control signaling may be selected based on a codebook size (e.g., a number of HARQ ACK/NACK bits). Each entry of the matrix may represent a decoding outcome, e.g. positive (ACK) or negative (NACK) acknowledgments, of the corresponding transmission. One or more of the entries of the codebook matrix may not correspond to a downlink transmission opportunity (e.g., a PDSCH occasion), for which a NACK is reported. This may increase a codebook robustness, e.g., in case of missed downlink assignments, and the base station may schedule a retransmission of the missed TB/CBG. The size of the semi-static codebook may be very large.

The dynamic codebook may be used to address the issue with the potentially large size of the semi-static codebook. With the dynamic codebook, only the ACK/NACK information of scheduled assignments, including one or more semi-persistent scheduling, may be included in the report, e.g., not all carriers as in semi-static codebook. A size of the dynamic codebook may be dynamically varying, e.g., as a function of a number of scheduled carriers and/or as a function of a number of scheduled transport blocks. To maintain a same understanding of the dynamic codebook size, which is prone to error in the downlink control signaling, a downlink assignment index (DAI) may be included in the scheduling DCI. The DAI field may comprise a counter DAI (cDAI) and a total DAI (tDAI), e.g., in case of carrier aggregation. The counter DAI in the scheduling DCI indicates a number of scheduled downlink transmissions (PDSCH reception(s)/SPS PDSCH release(s)) up to the point the DCI was received, in a carrier first, PDCCH monitoring occasion index second manner. The total DAI in the scheduling DCI indicates a total number of scheduled downlink transmissions across all carriers up to the point the DCI was received. A highest cDAI at a current time is equal to the tDAI at this time.

A wireless device may receive a downlink assignment from a base station. The wireless device may receive the downlink assignment on a physical downlink control channel (PDCCH). The downlink assignment may indicate that there are one or more transmissions on one or more downlink shared channels (DL-SCHs) for a particular MAC entity. The downlink assignment may provide hybrid automatic repeat request (HARQ) information of the one or more transmissions.

For each PDCCH occasion during which a UE monitors PDCCH and for each serving cell, the UE may receive a downlink assignment for the MAC entity's C-RNTI or TC-RNTI. The UE may consider the NDI to have been toggled, e.g., when this is a first downlink assignment for the TC-RNTI. The downlink assignment may be for the MAC entity's C-RNTI, and previous downlink assignment indicated to a HARQ entity of the same HARQ process may be a downlink assignment received for the MAC entity's CS-RNTI and/or a configured downlink assignment (e.g., semi-persistent scheduling (SPS)), and the UE may consider the NDI to have been toggled regardless of a value of the NDI. The MAC entity may indicate a presence of a downlink assignment and deliver the associated HARQ information (e.g., HARQ process number, NDI, etc.) to the HARQ entity.

The UE may receive a downlink assignment for a PDCCH occasion for a serving cell for the MAC entity's CS-RNTI. The UE may consider the NDI for the corresponding HARQ process not to have been toggled, and may indicate a presence of a downlink assignment and deliver the associated HARQ information to the HARQ entity, e.g. when the NDI in the received HARQ information is 1.

The NDI in the received HARQ information may be 0, and the PDCCH contents may indicate SPS deactivation. The UE may clear a configured downlink assignment for this serving cell (if any). A timer, e.g., timeAlignmentTimer, associated with a TAG containing the serving cell on which the HARQ feedback is to be transmitted may be running, and the UE may indicate a positive acknowledgment (ACK) for the SPS deactivation to the PHY layer.

The NDI in the received HARQ information may be 0, and the PDCCH content may indicate SPS activation. The UE may store the downlink assignment for this serving cell and the associated HARQ information as configured downlink assignment, and may initialize or re-initialize the configured downlink assignment for this serving cell to start in an associated PDSCH duration and to recur according to a configured periodicity.

For each serving cell and each configured downlink assignment (e.g., SPS PDSCH), if configured and activated, the MAC entity may instruct the PHY layer to receive, in this PDSCH duration, transport block on the DL-SCH according to the configured downlink assignment and to deliver it to the HARQ entity, e.g., if the PDSCH duration does not overlap with a PDSCH duration of a downlink assignment received on a PDCCH for this serving cell. The MAC entity may set the HARQ process number/ID to the HARQ process ID associated with this PDSCH duration, and may consider the NDI bit for the corresponding HARQ process to have been toggled. The MAC entity may indicate the presence of a configured downlink assignment (SPS PDSCH) and deliver the stored HARQ information to the HARQ entity.

The MAC entity may include a HARQ entity for each Serving Cell, which maintains a number of parallel HARQ processes. Each HARQ process may be associated with a HARQ process identifier/number. The HARQ entity directs HARQ information and associated TBs/CBGs received on the DL-SCH to the corresponding HARQ processes. A number of parallel DL HARQ processes per HARQ entity may be pre-defined or configured by RRC. The HARQ process may support one TB when the physical layer is not configured for downlink spatial multiplexing. The HARQ process may support one or two TBs when the physical layer is configured for downlink spatial multiplexing.

The MAC entity may be configured with repetition, e.g., pdsch-AggregationFactor >1, which provides a number of transmissions of a TB within a bundle of the downlink assignment. Bundling operation may rely on the HARQ entity for invoking the same HARQ process for each transmission that is part of the same bundle. After an initial transmission, pdsch-AggregationFactor−1 HARQ retransmissions may follow within a bundle.

When a transmission takes place for the HARQ process, one or two (in case of downlink spatial multiplexing) TBs and the associated HARQ information may be received from the HARQ entity. For each received TB and associated HARQ information, the HARQ process may consider the transmission to be a new transmission if the NDI, when provided, has been toggled compared to the value of the previous received transmission corresponding to this TB, and/or if this is a very first received transmission for this TB (e.g., there is no previous NDI for this TB). Otherwise, the HARQ process may consider this transmission to be a retransmission.

The MAC entity may attempt to decode the data, e.g., if this is a new transmission. The MAC entity may instruct the PHY layer to combine the received data with the data currently in the soft buffer for this TB and attempt to edcode the combined data, e.g., when this is a retransmission and/or the data for this TB has not yet been successfully decoded. The MAC entity may deliver the decoded MAC PDU to upper layers and/or the disassembly and demultiplexing entity, e.g. when the data for this TB is successfully decoded. The MAC entity may instruct the PHY layer to replace the data in the soft buffer for this TB with the data which the MAC entity attempted to decode, e.g. when the decoding is unsuccessful. The MAC entity may receive a retransmission with a TB size same as or different from the last TB size signalled for this TB.

A UE may receive a PDSCH without receiving a corresponding PDCCH (e.g., a configured downlink assignment and/or SPS PDSCH), and/or receive a PDCCH indicating a SPS PDSCH release. The UE may generate a corresponding HARQ-ACK information bit. If a UE is not configured with per-CBG retransmission (e.g., provided PDSCH-Code-BlockGroupTransmission), the UE may generate one HARQ-ACK information bit per transport block. For a HARQ-ACK information bit, a UE may generate an ACK, e.g. if the UE detects a DCI format 1_0 that provides a SPS PDSCH release and/or correctly decodes a transport block. For a HARQ-ACK information bit, a UE may generate a NACK if the UE does not correctly decode the transport block. A UE may or may not expect to be indicated to transmit HARQ-ACK information for more than one SPS PDSCH receptions in a same PUCCH.

A UE may multiplex UCI in a PUCCH transmission that overlaps with a PUSCH transmission. The UE may multiplex only HARQ-ACK information, if any, from the UCI in the PUSCH transmission (e.g. piggyback), and may not transmit the PUCCH, e.g., if the UE multiplexes aperiodic and/or semi-persistent CSI reports in the PUSCH.

A UE may not expect a PUCCH resource that results from multiplexing overlapped PUCCH resources, if applicable, to overlap with more than one PUSCHs, e.g., if each of the more than one PUSCHs includes aperiodic CSI reports.

A UE may not expect to detect a DCI format scheduling a PDSCH reception and/or a SPS PDSCH release and indicating a resource for a PUCCH transmission with corresponding HARQ-ACK information in a slot, e.g., if the UE previously detects a DCI format scheduling a PUSCH transmission in the slot and if the UE multiplexes HARQ-ACK information in the PUSCH transmission.

If a UE multiplexes aperiodic CSI in a PUSCH and the UE would multiplex UCI that includes HARQ-ACK information in a PUCCH that overlaps with the PUSCH and the timing conditions for overlapping PUCCHs and PUSCHs are fulfilled, the UE may multiplex only the HARQ-ACK information in the PUSCH and may not transmit the PUCCH.

If a UE transmits multiple PUSCHs in a slot on respective serving cells that include first PUSCHs that are scheduled by DCI format(s) 0_0 and/or DCI format(s) 0_1 and second PUSCHs configured by respective ConfiguredGrantConfig or semiPersistentOnPUSCH, and the UE would multiplex UCI in one of the multiple PUSCHs, and the multiple PUSCHs fulfil the conditions for UCI multiplexing, the UE may multiplex the UCI in a PUSCH from the first PUSCHs.

If a UE transmits multiple PUSCHs in a slot on respective serving cells and the UE would multiplex UCI in one of the multiple PUSCHs and the UE does not multiplex aperiodic CSI in any of the multiple PUSCHs, the UE may multiplex the UCI in a PUSCH of the serving cell with the smallest ServCellIndex subject to the conditions for UCI multiplexing being fulfilled. If the UE transmits more than one PUSCHs in the slot on the serving cell with the smallest ServCellIndex that fulfil the conditions for UCI multiplexing, the UE may multiplex the UCI in the earliest PUSCH that the UE transmits in the slot.

If a UE transmits a PUSCH over multiple slots and the UE would transmit a PUCCH with HARQ-ACK and/or CSI information over a single slot and in a slot that overlaps with the PUSCH transmission in one or more slots of the multiple slots, and the PUSCH transmission in the one or more slots fulfills the conditions for multiplexing the HARQ-ACK and/or CSI information, the UE may multiplex the HARQ-ACK and/or CSI information in the PUSCH transmission in the one or more slots. The UE may not multiplex HARQ-ACK and/or CSI information in the PUSCH transmission in a slot from the multiple slots, e.g., if the UE would not transmit a single-slot PUCCH with HARQ-ACK and/or CSI information in the slot in case the PUSCH transmission was absent.

If the PUSCH transmission over the multiple slots is scheduled by a DCI format 0_1, the same value of a DAI field may be applicable for multiplexing HARQ-ACK information in the PUSCH transmission in any slot from the multiple slots where the UE multiplexes HARQ-ACK information.

A HARQ-ACK information bit value of 0 represents a negative acknowledgement (NACK) while a HARQ-ACK information bit value of 1 represents a positive acknowledgement (ACK).

A wireless device may determine a number of resource elements for multiplexing UCIs comprising HARQ-ACK information and/or CSI reports and/or CG-UCI in a PUSCH based on one or more beta-offset values. The beta-offset value may be configured by RRC. The beta-offset value may be indicated by a DCI scheduling the PUSCH. The value of a beta-offset may be signaled to the wireless device either by a DCI format scheduling the PUSCH transmission or by higher layers.

A wireless device may receive an RRC message comprising configuration parameters of a PUSCH. The PUSCH configuration may enable multiplexing control information on the PUSC (e.g. UCI-OnPUSCH may be enabled/configured). The PUSCH configuration may comprise a set of beta-offset values for multiplexing control information (e.g. UCI) on the PUSCH. The wireless device may receive a DCI scheduling one or more PUSCH transmissions based on the PUSCH configuration. The DCI may comprise a beta-offset indicator field, indicating one or more beta-offset values from the set of beta-offset values configured by RRC. The wireless device may determine the one or more beta-offset values by mapping the beta-offset indicator field to the set of beta-offset values based on a pre-defined table. The beta-offset indicator field may indicate a first beta-offset index provided by RRC configuration. The beta-offset index may indicate/map to one or more beta-offset values based on the RRC configured set. For example, the beta-offset index may indicate at least one HARQ-ACK beta-offset index and/or at least one CSI-1 (CSI report part 1) beta-offset index and/or at least one CSI-2 (CSI report part 2) beta-offset index and/or at least one CG-UCI beta-offset index. The at least one HARQ-ACK beta-offset index may comprise one or more beta-offset indexes indicating one or more beta-offset values for multiplexing HARQ-ACK UCI in the PUSCH based on size of the HARQ-ACK UCI. For example, RRC configuration may configure multiple indexes for the HARQ-ACK beta-offset values to be used based on the size of the HARQ-ACK UCI (e.g. three indexes: betaOffsetACK-Index1 for up to 2 HARQ-ACK information bits, betaOffsetACK-Index2 more than 2 and up to 11 HARQ-ACK information bits, betaOffsetACK-Index3 more than 11 HARQ-ACK information bits). The wireless device may determine a beta-offset value for multiplexing HARQ-ACK information in the PUSCH, based on the beta-offset indicator field in the DCI scheduling the PUSCH and/or the size (bit width) of the HARQ-ACK information.

The amount of data traffic carried over cellular networks is expected to increase for many years to come. The number of users/devices is increasing, and each user/device accesses an increasing number and variety of services, e.g. video delivery, large files, images. This requires not only high capacity in the network, but also provisioning of very high data rates to meet customer expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of interworking solutions with Wi-Fi, e.g., LTE/WLAN interworking. This interest indicates that unlicensed spectrum, when present, may be an effective complement to licensed spectrum for cellular operators to address the traffic explosion in some scenarios, such as hotspot areas. For example, licensed assisted access (LAA) and/or new radio on unlicensed band(s) (NR-U) may offer an alternative for operators to make use of unlicensed spectrum while managing one radio network, thus offering new possibilities for optimizing the network's efficiency.

In an example embodiment, Listen-before-talk (LBT) may be implemented for transmission in an unlicensed cell. The unlicensed cell may be referred to as a LAA cell and/or a NR-U cell. The unlicensed cell may be operated as non-standalone with an anchor cell in a licensed band or standalone without an anchor cell in a licensed band. LBT may comprise a clear channel assessment (CCA). For example, in an LBT procedure, equipment may apply a CCA before using the unlicensed cell or channel. The CCA may comprise an energy detection that determines the presence of other signals on a channel (e.g., channel is occupied) or absence of other signals on a channel (e.g., channel is clear). A regulation of a country may impact the LBT procedure. For example, European and Japanese regulations mandate the usage of LBT in the unlicensed bands, such as the 5 GHz unlicensed band. Apart from regulatory requirements, carrier sensing via LBT may be one way for fairly sharing the unlicensed spectrum among different devices and/or networks attempting to utilize the unlicensed spectrum.

An LBT procedure may be employed for fair and friendly coexistence of a 3GPP system (e.g., LTE and/or NR) with other operators and technologies operating in unlicensed spectrum. For example, a node attempting to transmit on a carrier in unlicensed spectrum may perform a CCA as a part of an LBT procedure to determine if the channel is free for use. The LBT procedure may involve energy detection to determine if the channel is being used. For example, regulatory requirements in some regions, e.g., in Europe, specify an energy detection threshold such that if a node receives energy greater than the threshold, the node assumes that the channel is being used and not free. While nodes may follow such regulatory requirements, a node may optionally use a lower threshold for energy detection than that specified by regulatory requirements. A radio access technology (e.g., LTE and/or NR) may employ a mechanism to adaptively change the energy detection threshold. For example, NR-U may employ a mechanism to adaptively lower the energy detection threshold from an upper bound. An adaptation mechanism may not preclude static or semi-static setting of the threshold. In an example Category 4 LBT (CAT4 LBT) mechanism or other type of LBT mechanisms may be implemented.

Various example LBT mechanisms may be implemented. In an example, for some signals, in some implementation scenarios, in some situations, and/or in some frequencies no LBT procedure may be performed by the transmitting entity. In an example, Category 1 (CAT1, e.g., no LBT) may be implemented in one or more cases. For example, a channel in unlicensed band may be hold by a first device (e.g., a base station for DL transmission), and a second device (e.g., a wireless device) takes over the for a transmission without performing the CAT1 LBT. In an example, Category 2 (CAT2, e.g. LBT without random back-off and/or one-shot LBT) may be implemented. The duration of time determining that the channel is idle may be deterministic (e.g., by a regulation). A base station may transmit an uplink grant indicating a type of LBT (e.g., CAT2 LBT) to a wireless device. CAT1 LBT and CAT2 LBT may be employed for Channel occupancy time (COT) sharing. For example, a base station (a wireless device) may transmit an uplink grant (resp. uplink control information) comprising a type of LBT. For example, CAT1 LBT and/or CAT2 LBT in the uplink grant (or uplink control information) may indicate, to a receiving device (e.g., a base station, and/or a wireless device) to trigger COT sharing. In an example, Category 3 (CAT3, e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (CAT4, e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N may be used in the LBT procedure to determine the duration of time that the channel is sensed to be idle before the transmitting entity transmits on the channel.

In an example, a wireless device may employ uplink (UL) LBT. The UL LBT may be different from a downlink (DL) LBT (e.g. by using different LBT mechanisms or parameters) for example, since the NR-U UL may be based on scheduled access which affects a wireless device's channel contention opportunities. Other considerations motivating a different UL LBT comprise, but are not limited to, multiplexing of multiple wireless devices in a subframe (slot, and/or mini-slot).

In an example, DL transmission burst(s) may be a continuous (unicast, multicast, broadcast, and/or combination thereof) transmission by a base station (e.g., to one or more wireless devices) on a carrier component (CC). UL transmission burst(s) may be a continuous transmission from one or more wireless devices to a base station on a CC. In an example, DL transmission burst(s) and UL transmission burst(s) on a CC in an unlicensed spectrum may be scheduled in a TDM manner over the same unlicensed carrier. Switching between DL transmission burst(s) and UL transmission burst(s) may require an LBT (e.g., CAT1 LBT, CAT2 LBT, CAT3 LBT, and/or CAT4 LBT). For example, an instant in time may be part of a DL transmission burst or an UL transmission burst.

Channel occupancy time (COT) sharing may be employed in NR-U. COT sharing may be a mechanism by which one or more wireless devices share a channel that is sensed as idle by at least one of the one or more wireless devices. For example, one or more first devices may occupy a channel via an LBT (e.g., the channel is sensed as idle based on CAT4 LBT) and one or more second devices may share the channel using an LBT (e.g., 25 us LBT) within a maximum COT (MCOT) limit. For example, the MCOT limit may be given per priority class, logical channel priority, and/or wireless device specific. COT sharing may allow a concession for UL in unlicensed band. For example, a base station may transmit an uplink grant to a wireless device for a UL transmission. For example, a base station may occupy a channel and transmit, to one or more wireless devices a control signal indicating that the one or more wireless devices may use the channel. For example, the control signal may comprise an uplink grant and/or a particular LBT type (e.g., CAT1 LBT and/or CAT2 LBT). The one or more wireless device may determine COT sharing based at least on the uplink grant and/or the particular LBT type. The wireless device may perform UL transmission(s) with dynamic grant and/or configured grant (e.g., Type 1, Type2, autonomous UL) with a particular LBT (e.g., CAT2 LBT such as 25 us LBT) in the configured period, for example, if a COT sharing is triggered. A COT sharing may be triggered by a wireless device. For example, a wireless device performing UL transmission(s) based on a configured grant (e.g., Type 1, Type2, autonomous UL) may transmit an uplink control information indicating the COT sharing (UL-DL switching within a (M)COT). A starting time of DL transmission(s) in the COT sharing triggered by a wireless device may be indicated in one or more ways. For example, one or more parameters in the uplink control information indicate the starting time. For example, resource configuration(s) of configured grant(s) configured/activated by a base station may indicate the starting time. For example, a base station may be allowed to perform DL transmission(s) after or in response to UL transmission(s) on the configured grant (e.g., Type 1, Type 2, and/or autonomous UL). There may be a delay (e.g., at least 4 ms) between the uplink grant and the UL transmission. The delay may be predefined, semi-statically configured (via an RRC message) by a base station, and/or dynamically indicated (e.g., via an uplink grant) by a base station. The delay may not be accounted in the COT duration.

In an example, single and multiple DL to UL and UL to DL switching within a shared COT may be supported. Example LBT requirements to support single or multiple switching points, may comprise: for a gap of less than 16 us: no-LBT may be used; for a gap of above 16 us but does not exceed 25 us: one-shot LBT may be used; for single switching point, for a gap from DL transmission to UL transmission exceeds 25 us: one-shot LBT may be used; for multiple switching points, for a gap from DL transmission to UL transmission exceeds 25 us, one-shot LBT may be used.

In an example, a signal that facilitates its detection with low complexity may be useful for wireless device power saving, improved coexistence, spatial reuse at least within the same operator network, serving cell transmission burst acquisition, etc. In an example, a radio access technology (e.g., LTE and/or NR) may employ a signal comprising at least SS/PBCH block burst set transmission. Other channels and signals may be transmitted together as part of the signal. In an example, the signal may be a discovery reference signal (DRS). There may be no gap within a time span that the signal is transmitted at least within a beam. In an example, a gap may be defined for beam switching. In an example, a block-interlaced based PUSCH may be employed. In an example, the same interlace structure for PUCCH and PUSCH may be used. In an example, interlaced based PRACH may be used.

In an example, initial active DL/UL BWP may be approximately 20 MHz for a first unlicensed band, e.g., in a 5 GHz unlicensed band. An initial active DL/UL BWP in one or more unlicensed bands may be similar (e.g., approximately 20 MHz in a 5 GHz and/or 6 GHz unlicensed spectrum), for example, if similar channelization is used in the one or more unlicensed bands (e.g., by a regulation).

In an example, HARQ acknowledge and negative acknowledge (A/N) for the corresponding data may be transmitted in a shared COT (e.g., with a CAT2 LBT). In some examples, the HARQ A/N may be transmitted in a separate COT (e.g., the separate COT may require a CAT4 LBT). In an example, when UL HARQ feedback is transmitted on unlicensed band, a radio access technology (e.g., LTE and/or NR) may support flexible triggering and multiplexing of HARQ feedback for one or more DL HARQ processes. HARQ process information may be defined independent of timing (e.g., time and/or frequency resource) of transmission. In an example, UCI on PUSCH may carry HARQ process ID, NDI, RVID. In an example, Downlink Feedback Information (DFI) may be used for transmission of HARQ feedback for configured grant.

In an example, CBRA and CFRA may be supported on SpCell. CFRA may be supported on SCells. In an example, an RAR may be transmitted via SpCell, e.g., non-standalone scenario. In an example, an RAR may be transmitted via SpCell and/or SCell, e.g., standalone scenario. In an example, a predefined HARQ process ID for an RAR.

In an example, carrier aggregation between licensed band NR (PCell) and NR-U (SCell) may be supported. In an example, NR-U SCell may have both DL and UL, or DL-only. In an example, dual connectivity between licensed band LTE (PCell) and NR-U (PSCell) may be supported. In an example, Stand-alone NR-U where all carriers are in one or more unlicensed bands may be supported. In an example, an NR cell with DL in unlicensed band and UL in licensed band or vice versa may be supported. In an example, dual connectivity between licensed band NR (PCell) and NR-U (PSCell) may be supported.

In an example, a radio access technology (e.g., LTE and/or NR) operating bandwidth may be an integer multiple of 20 MHz, for example, if absence of Wi-Fi cannot be guaranteed (e.g. by regulation) in an unlicensed band (e.g., 5 GHz, 6 GHZ, and/or sub-7 GHz) where the radio access technology (e.g., LTE and/or NR) is operating. In an example, a wireless device may performance or more LBTs in units of 20 MHz. In an example, receiver assisted LBT (e.g., RTS/CTS type mechanism) and/or on-demand receiver assisted LBT (e.g., for example receiver assisted LBT enabled only when needed) may be employed. In an example, techniques to enhance spatial reuse may be used.

In an operation in an unlicensed band (e.g., LTE eLAA/feLAA and/or NR-U), a wireless device may measure (averaged) received signal strength indicator (RSSI) and/or may determine a channel occupancy (CO) of one or more channels. For example, the wireless device may report channel occupancy and/or RSSI measurements to the base station. It may be beneficial to report a metric to represent channel occupancy and/or medium contention. The channel occupancy may be defined as a portion (e.g., percentage) of time that RSSI was measured above a configured threshold. The RSSI and the CO measurement reports may assist the base station to detect the hidden node and/or to achieve a load balanced channel access to reduce the channel access collisions.

Channel congestion may cause an LBT failure. The probability of successful LBT may be increased for random access and/or for data transmission if, for example, the wireless device selects the cell/BWP/channel with the lowest channel congestion or load. For example, channel occupancy aware RACH procedure may be considered to reduce LBT failure. For example, the random access backoff time for the wireless device may be adjusted based on channel conditions (e.g., based on channel occupancy and/or RSSI measurements). For example, a base station may (semi-statically and/or dynamically) transmit a random access backoff. For example, the random access backoff may be predefined. For example, the random access backoff may be incremented after or in response to one or more random access response reception failures corresponding to one or more random access preamble attempts.

In unlicensed operation (e.g. NR-U), it may be beneficial for the UE to transmit a HARQ ACK/NACK for a corresponding data in a same shared COT. For example, the UE may receive a DL transmission (e.g. PDCCH and/or PDSCH) in a COT and may transmit a HARQ ACK/NACK for the DL transmission in the COT. For example, the base station may acquire/initiate the COT by performing one or more LBT procedures. The UE may transmit one or more HARQ ACK/NACK information for one or more corresponding DL transmissions (e.g. PDCCH and/or PDSCH) in the same shared COT, if possible, considering a UE processing time required between the received DL transmission and the HARQ ACK/NACK transmission. A gap (e.g., up to 16 μs) may be allowed between an end of a DL transmission and the immediate transmission of a HARQ feedback to accommodate for a hardware turnaround time. The base station may schedule UL/DL transmissions (e.g., CSI reporting or SRS, or other PUSCH, or CSI-RS, or other PDSCH) in the time between one DL transmission for a UE and the corresponding UL transmission of HARQ feedback for the same UE within a shared COT. The scheduled UL/DL transmissions in the time gap may be pre-configured and/or pre-determined transmissions, e.g. for reducing signaling overhead.

The UE may transmit one or more HARQ feedbacks of one or more DL transmissions in a separate COT (e.g. second COT) from the COT the corresponding DL transmission(s) was received (e.g. first COT). The base station may configure/signal a non-numerical value of the PDSCH-to-HARQ-feedback timing indicator (e.g. K1 value) in a DCI scheduling the PDSCH and/or a DCI releasing DL SPS. The non-numerical value indicates to the UE that the timing and resource for HARQ-ACK feedback transmission for the corresponding PDSCH/PDCCH will be determined later. A first DCI format (e.g. DCI format 1_0) may not support signaling a non-numerical value for the PDSCH-to-HARQ-feedback timing indicator.

The UE may be configured to report one or more HARQ feedbacks for one or more DL transmissions from one or more earlier COTs, e.g. with or without an explicit request/trigger from the base station.

The PDSCH-to-HARQ-feedback timing indicator (K1 value) in the DCI scheduling the PDSCH may indicate an UL resource (e.g. PUCCH and/or PUSCH) in a next COT. For example, the UE may receive a PDSCH/PDCCH in a first COT, and transmit the corresponding HARQ feedback in a second COT, e.g. based on the PDSCH-to-HARQ-feedback timing indicator (K1 value) in the DCI. For example, the second COT may be the next COT after the first COT (e.g. cross-COT HARQ-ACK feedback). A second DCI may provide the HARQ feedback timing and resource information to the UE. The second DCI may indicate an LBT category for transmission of the HARQ feedback in the second COT. The second DCI may be received before or after the first DCI.

The base station (BS) may configure via RRC signaling, a non-numerical value for HARQ feedback timing, e.g. dl-DataToUL-ACK, that may be signaled by a scheduling DCI, e.g. via parameter PDSCH-to-HARQ-feedback timing indicator. The non-numerical value may indicate that the UE may store/defer the HARQ A/N feedback result for the corresponding PDSCH/PDCCH, and may not provide any timing for the transmission of this HARQ A/N feedback result.

The BS may configure a UE with enhanced dynamic codebook for HARQ feedback operation. The BS may trigger a group of DL transmissions, e.g. PDSCHs, for example, in an enhanced dynamic codebook operation. For example, one or more fields in a DCI may indicate one or more PDSCHs/PDCCHs to be acknowledged via an indicated UL resource. For example, the group of DL transmissions may comprise one or more HARQ processes, and/or may overlap with one or more slots/subframes, and/or may derived from a dynamic time window. The DCI may be carrying a DL scheduling assignment and/or an UL grant and/or a DCI not carrying a scheduling grant. The DCI may comprise one or more HARQ feedback timing values indicating the UL resource.

A DCI scheduling a DL assignment, e.g. PDSCH, may associate the PDSCH to a group. For example, the DCI may comprise a field indicating a group index. For example, a PDSCH scheduled by a first DCI format (e.g. DCI format 1_0) may be associated with a pre-defined group (e.g. PDSCH group #0). For example, an SPS PDSCH occasion may be associated with a pre-defined group. For example, and SPS PDSCH occasion may be associated with a first group, wherein the activation DCI indicates an index of the first group. For example, an SPS release PDCCH may be associated with a pre-defined group. For example, the SPS release PDCCH may indicate an index of a group.

The base station may schedule a first PDSCH with a PDSCH-to-HARQ-feedback timing, e.g. K1 value, in a COT with a first group index. The PDSCH-to-HARQ-feedback timing may have a non-numerical value. The BS may schedule one or more PDSCHs after the first PDSCH in the same COT, and may assign the first group index to the one or more PDSCHs. At least one of the one or more PDSCHs may be scheduled with a numerical K1 value.

The DCI may indicate a new ACK-feedback group indicator (NFI) for each PDSCH group. The NFI may operate as a toggle bit. For example, the UE may receive a DCI that indicates the NFI is toggled for a PDSCH group. The UE may discard one or more HARQ feedbacks for one or more PDSCHs in the PDSCH group. The one or more PDSCHs may be associated/scheduled with one or more non-numerical K1 values and/or numerical K1 values. The UE may expect DAI values of the PDSCH group to be reset.

The UE may be configured with enhanced dynamic codebook. The UE receive a first DCI format (e.g. DCI format 1_0) scheduling one or more PDSCHs. The one or more PDSCHs may be associated with a PDSCH group (e.g. a pre-defined PDSCH group, e.g. group #0). The first DCI format may not indicate an NFI value for the PDSCH group. The UE may determine the NFI value based on a second DCI format (e.g. DCI format 1_1) indicating the NFI value for the PDSCH group. The UE may detect the second DCI format since a last scheduled PUCCH and before a PUCCH occasion, wherein the second PUCCH occasion may comprise HARQ feedback corresponding to a PDSCH scheduled with the first DCI format. The last scheduled PUCCH may comprise HARQ feedback for the PDSCH group. The UE may not detect the second DCI that indicates the NFI value for the PDSCH group, and the UE may assume that the one or more PDSCHs scheduled by the first DCI format do not belong to any PDSCH group, and the UE may report the HARQ feedback of at least one PDSCH scheduled by the first DCI format since a lastest PUCCH occasion.

A DCI may request/trigger HARQ feedback for one or more groups of PDSCHs, e.g. via a same PUCCH/PUSCH resource. HARQ feedbacks for multiple DL transmissions, e.g. PDSCHs, in a same group, may be transmitted/multiplexed in a same PUCCH/PUSCH resource. Counter DAI and total DAI values may be incremented/accumulated within a PDSCH group.

A UE may postpone transmission of HARQ-ACK information corresponding to PDSCH(s) in a PUCCH for K1 values that result in a time T, being the time between a last symbol of the PDSCH(s) and a starting symbol of the PUCCH, that is less than a required processing time for PUCCH transmission.

The UE may receive a downlink signal (e.g. RRC and/or DCI) scheduling a PDSCH. The UE may be configured with enhanced dynamic codebook HARQ feedback operation. The PDSCH may be scheduled with a non-numerical value for PDSCH-to-HARQ-feedback timing, e.g. K1. The UE may derive/determine a HARQ-ACK timing information for the PDSCH by a next/later DCI. The next DCI may be a DL DCI scheduling one or more PDSCHs. The next DCI may comprise a numerical K1 value, indicating one or more PUCCH/PUSCH resources for HARQ feedback transmission of one or more DL transmissions, comprising the PDSCH. The next DCI may trigger HARQ feedback transmission for one or more PDSCH groups comprising a group of the PDSCH. The UE may derive/determine the HARQ-ACK timing information for the PDSCH by a last/earlier DCI.

The UE may receive a first DCI scheduling a PDSCH with non-numerical K1 value. For (non-enhanced) dynamic HARQ-ACK codebook, the UE may determine/derive a HARQ-ACK timing for the PDSCH scheduled with non-numerical K1 value, by a second DCI. The second DCI may schedule a second PDSCH with a numerical K1 value. The UE may receive the second DCI after the first DCI.

The base station may transmit a DCI requesting/triggering HARQ feedback of a HARQ-ACK codebook containing one or more or all, DL HARQ processes (e.g. one-shot feedback request). The one-shot feedback request may be for one or more or all component carriers configured for the UE. One-shot feedback may be configured separately from a HARQ-ACK codebook configuration.

The wireless device may transmit HARQ feedback of one or more PDSCHs in response to receiving a one-shot feedback request. A last/latest PDSCH for which an acknowledgment is reported in response to receiving the one-shot feedback request, may be determined as a last PDSCH within a UE processing time capability (e.g. baseline capability, N1). The UE may report HARQ-ACK feedback for one or more earlier PDSCHs scheduled with non-numerical K1 value. The one-shot feedback may be requested in a UE-specific DCI. The one-shot feedback may request HARQ feedbacks to be reported in a PUCCH. The HARQ feedback may be piggybacked on (e.g. multiplexed in) a PUSCH.

The wireless device may be configured to monitor feedback request for one-shot HARQ-ACK codebook feedback. The feedback may be requested in a DCI format (e.g. DCI format 1_1). The DCI format may or may not schedule DL transmission (e.g. PDSCH). The DCI format may comprise a first field (e.g. a frequency domain resource allocation field) indicating a first value. The UE may determine that the DCI format does not schedule a PDSCH in response to the first field indicating the first value. The UE may ignore/ discard one or more second fields of the DCI format (e.g., a HARQ process number and/or NDI field) in response to the determining. The UE may be scheduled to report one-shot feedback and one or more other HARQ-ACK feedbacks in a same slot/subframe/resource, and the UE may report only the one-shot feedback.

In a one-shot codebook, one or more NDI bits may follow one or more HARQ-ACK information bits for each of one or more TBs. The HARQ-ACK information bits and the corresponding NDI may be ordered in the one-shot codebook as follows: first in an increasing order of CBG index, second in an increasing order of TB index, third in an increasing order of HARQ process ID, and fourth in an increasing order of serving cell index.

The wireless device may transmit the HARQ-ACK for a PDSCH, that is scheduled with non-numerical K1 value, via one-shot HARQ feedback. The wireless device may not include the HARQ-ACK for a PDSCH, that is scheduled with non-numerical K1 value, in a semi-static codebook. The wireless device may include the HARQ-ACK for a PDSCH, that is scheduled with non-numerical K1 value, in a semi-static codebook. With semi-static codebook, HARQ-ACK timing for a PDSCH scheduled with a non-numerical K1 may be derived based on the next DL DCI scheduling PDSCH with a numerical K1 value. A wireless device may report HARQ-ACK in the appended bit container. With dynamic codebook, HARQ-ACK timing for a PDSCH scheduled with DCI indicting a non-numerical K1 may be derived based on the next DCI scheduling PDSCH with a numerical K1 value. The wireless device may expect that DAI is reset for PDSCH transmitted later than N1 symbols before PUCCH transmission.

In an example, a base station may schedule multiple Transmission Time Intervals (TTIs) for multiple PUSCH transmissions, also referred to as multi-TTI scheduling. For example, each TTI may be scheduled using a separate UL grant (e.g., multiple DCIs) in the same PDCCH monitoring occasion. In another example, a base station may schedule multiple TTIs for multiple PUSCH transmissions, using a single UL grant (e.g., single DCI). For example, multiple (e.g., different) TBs with different HARQ process IDs may be scheduled over the multiple TTIs (e.g., multiple slots/mini-slots/subslots/subframes). For example, a first (same) TB associated with a first HARQ process ID may be scheduled over the multiple TTIs (e.g., for multiple repetitions) using a single UL grant. The UE may rate-match the first TB across all TTIs. The UE may transmit the first TB with one or more (e.g. different) RVs in different TTIs.

In an example, a TTI may be a subframe, and/or one or more slots, and/or one or more mini-slots. A slot may comprise, e.g., 14 consecutive OFDM symbols. A mini-slot may comprise, e.g., one or more consecutive OFDM symbols, which may be shorter than a slot.

In an example, a wireless device may receive one or more RRC messages comprising configuration parameters of one or more PUSCH configurations for at least one BWP of a serving cell. A PUSCH configuration may comprise a PUSCH time domain resource allocation (TDRA) list for a DCI format (e.g. PUSCH-TimeDomainResourceAllocation-ListForDCI-Format0-1, PUSCH-TimeDomainResourceAllocationListForDCI-Format0-2). A PUSCH TDRA list may be used to configure a time domain relation between PDCCH associated with a reception of the DCI format and the PUSCH(s) scheduled by the DCI format. The PUSCH TDRA list may comprise one or more TDRA values (e.g. up to 8). Each TDRA value may indicate time domain scheduling parameters for a PUSCH, e.g. a slot offset (K2) from the PDCCH; a PUSCH mapping type; a starting symbol and length (SLIV) or a starting symbol (S) and a symbol duration of the PUSCH (L); and a number of repetitions. The network may indicate in an uplink grant in the DCI format which of the configured TDRA value(s) in the PUSCH TDRA list the wireless device may apply for the UL grant. The wireless device may determine a bit width of the DCI field (TDRA field in the DCI format) based on a number of entries in the RRC parameter, e.g. the PUSCH TDRA list configured by RRC. A first value in the DCI field may refer to a first entry/element in this RRC list.

In an example, a base station may transmit a DCI format to schedule uplink transmission, e.g., PUSCH, in each of one or more transmission time intervals (TTIs) for a UE, e.g. in an unlicensed cell (e.g., LAA SCell and/or NR-U PCell). For example, DCI format 0B is used for scheduling of PUSC in each of multiple subframes in a LAA SCell. In another example, DCI format 4B may be used for scheduling of PUSCH with multi-antenna port transmission mode in each of multiple subframes in a LAA SCell. Such DCI format may be referred to a multi-TTI DCI format.

A multi-TTI DCI format may comprise at least the following information: identifier for DCI formats; carrier indicator; downlink feedback indication (DFI) flag, if the wireless device is configured for operation in a cell with shared spectrum channel access (unlicensed spectrum). In an example, the DCI format may not be for indicating downlink feedback, e.g. the DFI is zero. In an example, the DCI format may be used for scheduling one or multiple PUSCH in at least one cell (e.g. multi-TTI scheduling) and/or activating type 2 configured grant transmission. In the example, the DCI format may comprise at least the following information: UL/SUL indicator; BWP indicator; frequency domain resource assignment (FDRA); one or more time domain resource assignments (TDRA) values for the one or more PUSCHs scheduled by the DCI format; a modulation and coding scheme for the one or more PUSCHs; one or more new data indicators (NDIs) for the one or more PUSCHs; one or more redundancy versions (RVs) for the one or more PUSCHs; a HARQ process number/ID for a first PUSCH of the one or more PUSCHs; at least one downlink assignment index (DAI); CSI request; CBG transmission information; a beta-offset indicator indicating one or more beta-offset values for one or more UCI types comprising HARQ-ACK and/or SR and/or CSI report; a channel access CP extension and/or channel access priority class (CAPC); etc.

In an example, for multi-TTI scheduling and/or single-TTI scheduling for PUSCH, a wireless device may attempt transmitting a PUSCH at a single starting position indicated in the UL grant for this PUSCH.

The base station may schedule time-contiguous transmissions of multiple PUSCHs. The base station may schedule non-time-contiguous transmissions of multiple PUSCHs. For example, multi-TTI scheduling by a single DCI may schedule a plurality of consecutive TTIs. For example, in multi-TTI scheduling, the base station may schedule a plurality of PUSCHs that are continuous in time. A single PUSCH duration may not exceed 14 OFDM symbols. In an example, each PUSCH may be mapped to one slot and/or one mini-slots. In another example, each PUSCH may be mapped to one or more slots and/or one or more mini-slots, e.g., the one or more slots and/or the one or more mini-slots may be consecutive.

Multiple PUSCHs scheduled by the multi-TTI DCI may be contiguous. For example, the network may configure/indicate the TDRA values in the DCI such that the scheduled PUSCHs are contiguous in time. The TDRA list/table configuration (RRC configuration) may allow indicating single or multiple continuous PUSHCs in any slot of the multiple scheduled slots. Each entry/row of the TDRA table/list indicates a number of scheduled PUSCHs by a single DCI. For example, a number of scheduled PUSCHs may be signaled by a number of indicated valid SLIVs in the row/entry/element of the configured PUSCH TDRA list that is signaled/indicated in the scheduling DCI. For example, if the RRC configuration of PUSCH TDRA list (e.g. PUSCH-TimeDomainResourceAllocationList) comprises a row/entry/element indicating TDRA value for multiple contiguous PUSCHs, the slot offset (K2) may indicate the slot where the wireless device may transmit the first PUSCH of the multiple PUSCHs. Each PUSCH may have a separate starting symbol and length (e.g. SLIV) and/or mapping type.

Figure 18:
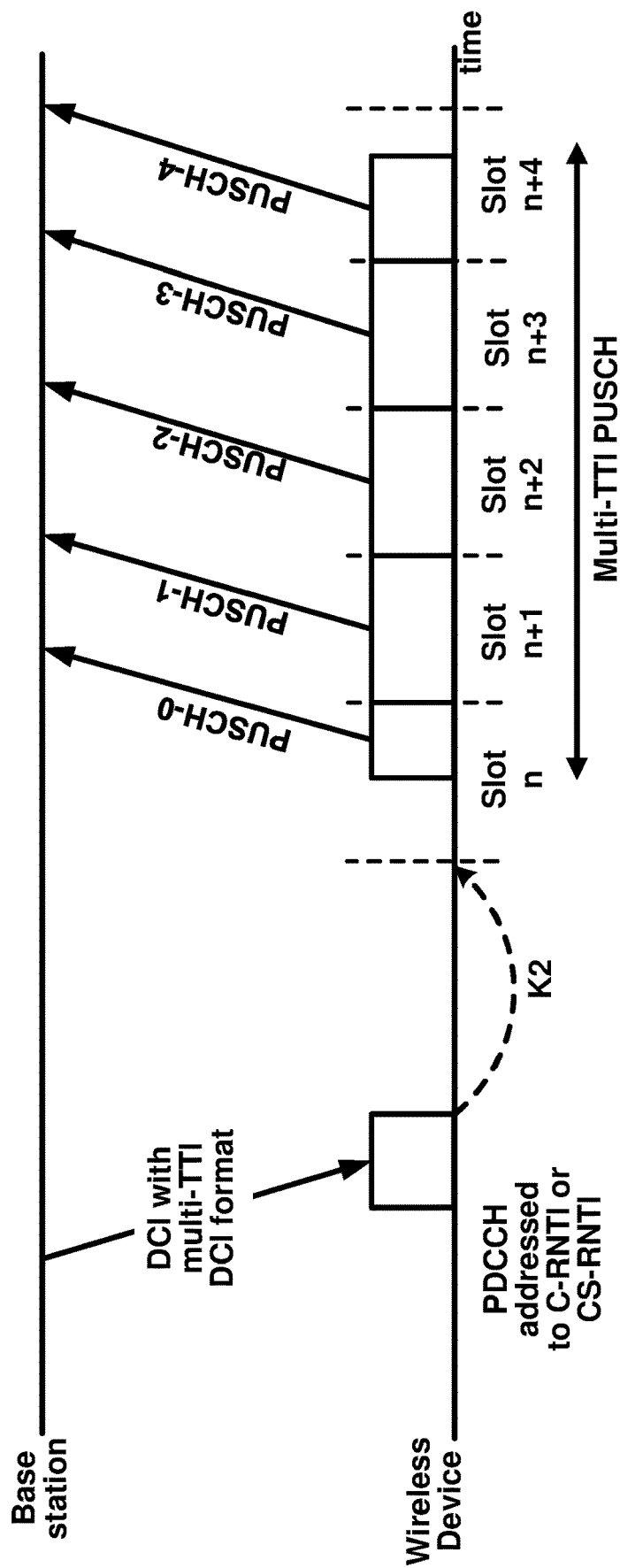
FIG. 18 shows an example of multiple PUSCH scheduling by a single DCI, according to some embodiments of the present disclosure.

FIG. 18 shows an example of multiple PUSCH scheduling by a single DCI, according to some embodiments. As shown in FIG. 18, the wireless device may receive a DCI format addressed to a radio network temporary identifier (e.g. C-RNTI or CS-RNTI) of the wireless device in a PDCCH monitoring occasion. The DCI format may comprise a slot offset (K2) indicating a first slot (slot n) comprising a first PUSCH (PUSCH-0). The DCI format may comprise a TDRA field indicating an entry/row of an RRC configured TDRA table, wherein the entry/row may comprise a plurality of TRDA values. For example, the TDRA field in the DCI format in FIG. 18 indicates an entry with 5 TDRA values. The wireless device determines, based on the number of TDRA values indicated by the DCI format, that 5 consecutive/contiguous PUSCHs are configured. The wireless device determines that the first PUSCH (PUSCH-0) starts in a first slot (slot n) indicated by the slot offset (K2) in the DCI format (applied to the PDCCH monitoring occasion of the DCI format). The wireless device determines four more contiguous PUSCHs in the following slots based on the TDRA values indicated by the TDRA field: PUSCH-1 in slot n+1, PUSCH-2 in slot n+2, PUSCH-3 in slot n+3, PUSCH-4 in slot n+4. The wireless device may determine a starting symbol and a length of each PUSCH based on the SLIV indicated by the corresponding TDRA value of that PUSCH. As it can be seen in the figure, PUSCH-0 starts in a symbol number other than #0 in slot n and have a length shorter than 14 symbols. PUSCH-1 and PUSCH-2 and PUSCH-3 start at symbol #0 of the corresponding slots, e.g. slot n+1 and slot n+2 and slot n+3, respectively, and have a duration/length of 14 symbols. PUSCH-4 starts at symbol #0 of slot n+4 and have a length shorter than 14 symbols. As it can be seen, as a result of the indicated TDRA values, the scheduled PUSCHs are contiguous in time and there is no time gap in between the PUSCHs. This results in requiring, if any, only one LBT procedure at the beginning of the burst/multiple PUSCHs.

Figure 19:
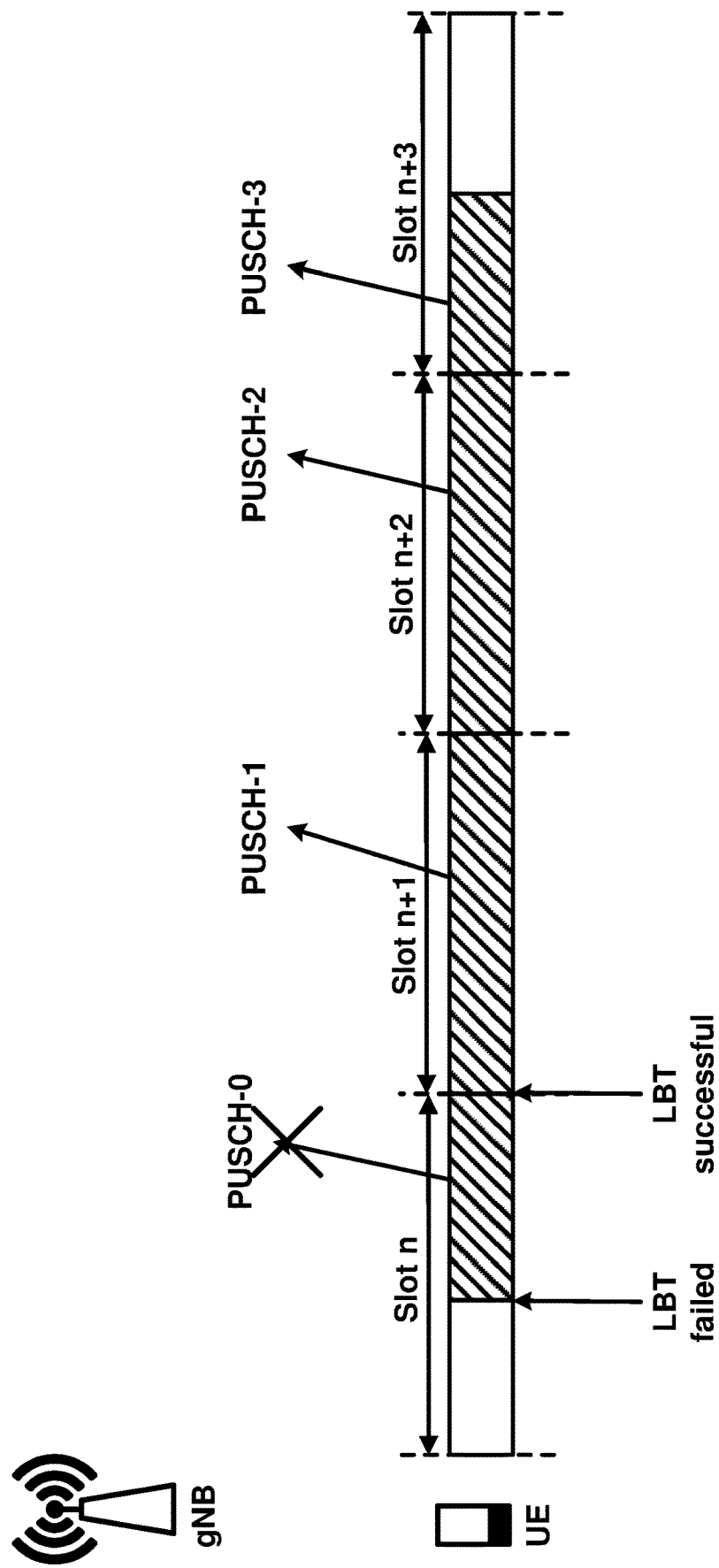
FIG. 19 shows an example of LBT procedure for transmission of multiple PUSCHs scheduled by a multi-TTI grant, according to some embodiments of the present disclosure.

FIG. 19 shows an example of LBT procedure for transmission of multiple PUSCHs scheduled by a multi-TTI grant, according to some embodiments. In this example, four contiguous PUSCHs are scheduled in four consecutive slots: PUSCH-0 in slot n, PUSCH-1 in slot n+1, PUSCH-2 in slot n+2, and PUSCH-3 in slot n+3. The wireless device performs a first LBT procedure at slot n for the PUSCH-0 transmission. The first LBT procedure may be based on an LBT type and/or CAPC indicated by the multi-TTI grant (the scheduling DCI). The first LBT in slot n may fail, e.g. may indicate a busy/occupied channel. In response the failure of the first LBT procedure, the wireless device may perform a second LBT procedure for transmission of the next PUSCH, that is PUSCH-1 in slot n+1. The second LBT may be based on the LBT type and/or CAPC indicated by the multi-TTI grant. The second LBT may be same as first LBT. The second LBT may be different from the first LBT. The second LBT may be a CAT4 LBT. The second LBT may be successful, e.g. indicating an idle channel. The wireless device may transmit PUSCH-1 in slot n+1 in response to the successful LBT, as well as the following PUSCHs (PUSCH-2 and PUSC-3), continuously. In case the second LBT may fail, the wireless device may continuous sensing the channel/performing more LBT procedures prior to a next PUSCH transmission until a successful LBT is secured.

The base station may schedule discontinuous HARQ IDs for scheduling multiple TBs with different HARQ process IDs in multiple TTIs. The base may indicate in the multi-TTI scheduling DCI a HARQ process ID to be applied to the first scheduled PUSCH, e.g., for the first TTI. For example, the HARQ process ID may be incremented by 1 for subsequent PUSCHs in the scheduled order. For example, modulo operation may be used if the number of scheduled PUSCHs are more than the available/configured number of HARQ IDs.

The base station may signal at least the following information in a DCI scheduling multiple PUSCHs: NDI field with 1 NDI bit per PUSCH; RV field with one or more RV bits per PUSCH; CBGTI field, e.g., per retransmitted PUSCH and/or per PUSCH and/or for a number of PUSCHs; HARQ process ID of a first PUSCH; time domain resource assignment (TDRA) field; CSI request field, e.g., for a single PUSCH; MCS field; LBT (channel access) type; channel access priority class (CAPC); etc.

The multi-TTI DCI may comprise a MCS field indicating one or more MCS indexes (e.g. entry/row of an MCS table). For example, a single MCS index may be signaled for the multiple scheduled PUSCHs. For example, the UE may apply the same behavior for a first PUSCH scheduled for initial transmission and a second PUSCH scheduled for retransmission. For example, the behavior may be: determining the TB size based on explicitly indicated MCS (e.g., for MCS row 0-27); and/or referring to the DCI scheduling the initial PUSCH transmission to determine the TB size (e.g., for MCS row 28-31). In an example, a single MCS (e.g., row 0-27) may be indicated in the multi-TTI DCI. For example, the UE may apply different behavior for a first PUSCH scheduled for initial transmission and a second PUSCH scheduled for retransmission. For example, for the first PUSCH scheduled for initial transmission, the UE may determine the TB size based on the indicated MCS. For example, for the second PUSCH scheduled for retransmission, the UE may refer to the DCI scheduling the initial PUSCH transmission to determine the TB size. For example, the UE may not expect to receive signaling of a MCS row 28-31 in a multi-TTI DCI. In another example, the MCS field of the multi-TTI DCI may comprise a bitmap. The UE may use the bitmap to determine one or more first PUSCHs to use the indicated MCS row, and one or more second PUSCHs to use a MCS row indicated by the previous DCI scheduling the same TB.

In an example, a multi-TTI DCI may indicate a CSI report request. For example, a DCI scheduling multiple PUSCHs may request a CSI report transmission. The wireless device may determine a first PUSCH/slot from the multiple PUSCHs/scheduled slots for transmission of the CSI report. For example, the wireless device may determine a last or a second last PUSCH/slot to transmit the CSI report. For example, the wireless device may determine the last PUSCH/slot to transmit the CSI report, if the number of scheduled PUSCHs is not more than two. For example, the wireless device may determine the second last (the one before the last) PUSCH/slot to transmit the CSI report, if the number of scheduled PUSCHs is more than two.

For a multi-TTI grant, a wireless device may map generated transport blocks (TBs) internally to different HARQ processes, e.g. in case of LBT failure(s). For example, the wireless device may transmit a TB, pending for transmission in a first HARQ process due to a failed LBT for a first PUSCH transmission associated with the first HARQ process, in a second HARQ process. For example, the second HARQ process may be associated with a second PUSCH for which LBT is successful. The TB may be a new TB, e.g. pending/ready for initial transmission. The wireless device may transmit a new TB on any HARQ process of the multi-TTI grant associated with a second PUSCH. The second PUSCH may have a same TB size (TBS) and/or same RV as the first PUSCH. The NDI of the second PUSCH may indicate a new transmission. The second PUSCH may not be scheduled for a HARQ process that is associated with a retransmission, otherwise an ambiguity between the wireless device and the base station may occur in identifying the TBs across HARQ processes. So this may only apply to HARQ processes that are associated with initial transmissions, indicated by the corresponding NDI bit(s).

One or more PUCCH resources may overlap with at least one PUSCH of the multiple PUSCHs scheduled by a multi-TTI grant in a DCI. In an example, UCI associated with a PUCCH overlapping with a PUSCH of a multi-TTI grant, may be transmitted/piggybacked on a last PUSCH of the multiple PUSCHs scheduled by the DCI. This may increase a probability of successful LBT and/or transmission of the UCI. In an example, a HARQ-ACK codebook comprised in the UCI may not be changed. In an example, if multiple PUCCHs comprising HARQ-ACKs overlap with one or more PUSCHs of the multi-TTI grant, multiple HARQ-ACK codebooks associated with each PUCCH may be concatenated based on a time sequence of the multiple PUCCHs.

Figure 20:
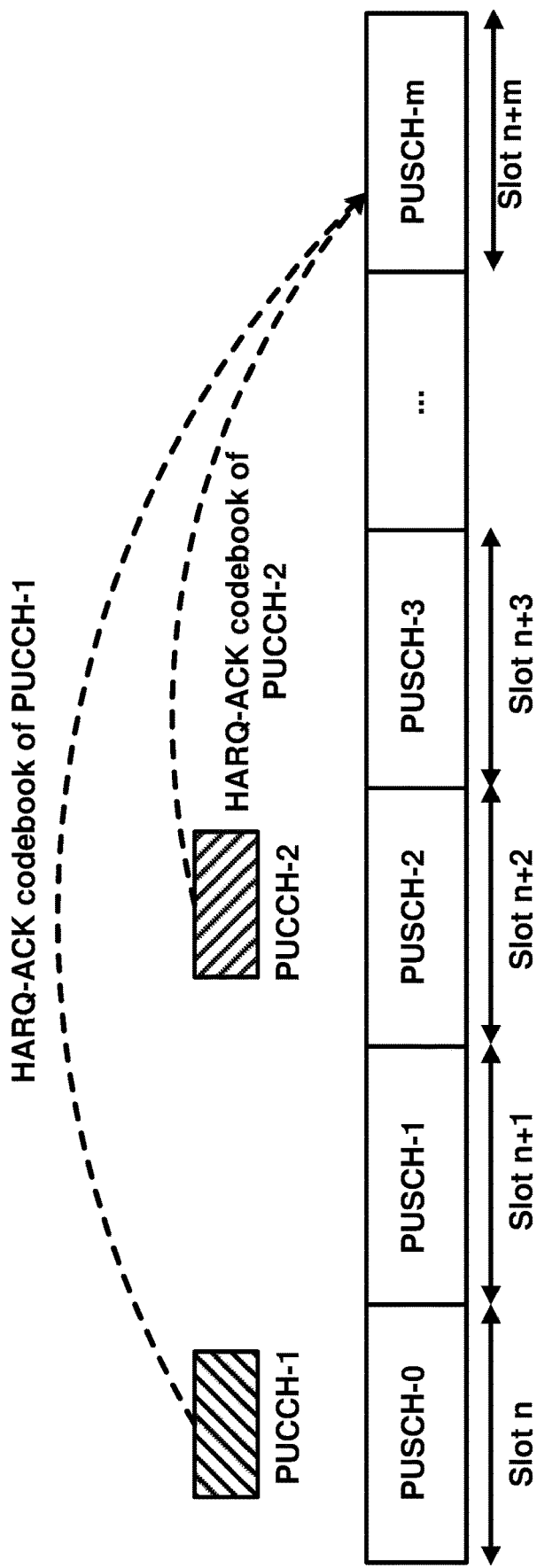
FIG. 20 shows an example of PUCCH collision with any of multiple PUSCHs scheduled by a DCI, according to some embodiments of the present disclosure.

FIG. 20 shows an example of PUCCH collision with a PUSCH of multiple PUSCHs scheduled by a DCI, according to some embodiments. In this example, a wireless device receives a DCI that schedules multiple (m) contiguous PUSCHs in slot n to slot n+m. The wireless device determines a first PUCCH (PUCCH-1) and a second PUCCH (PUCCH-2) overlap in time domain with the multiple PUSCHs of the multi-TTI grant. For example, the first PUCCH overlaps with PUCCH-0 in slot n and the second PUCCH overlaps with PUSCH-2 in slot n+2. For example, the first PUCCH may be associated with a first UCI comprising a first HARQ-ACK codebook. For example, a first HARQ feedback timing (e.g. PDSCH-to-HARQ feedback timing indicator value) of a first PDSCH reception/SPS release scheduled by a first DCI may indicate the slot n for the first HARQ-ACK codebook transmission. For example, the second PUCCH may be associated with a second UCI comprising a second HARQ-ACK codebook. For example, a second HARQ feedback timing (e.g. PDSCH-to-HARQ feedback timing indicator value) of a second PDSCH reception/SPS release scheduled by a second DCI may indicate the slot n+2 for the second HARQ-ACK codebook transmission. The wireless device may determine a combined HARQ-ACK codebook comprised of the first HARQ-ACK codebook followed by the second HARQ-ACK codebook. The wireless device may transmit the combined codebook via the last PUSCH (PUSCH-m) in slot n+m. The wireless device may not transmit PUCCH-1 and/or PUCCH-2.

In an example, a PUCCH resource comprising HARQ-ACK UCI may overlap with a first (e.g. earliest) PUSCH of a multiple PUSCHs scheduled by a DCI (multi-TTI grant). Based on existing technologies, the wireless device may multiplex/piggyback the HARQ-ACK UCI in the first PUSCH. The wireless device may perform at least one LBT procedure prior to the first PUSCH transmission (e.g. a long/CAT4 LBT with a low priority). However, the at least one LBT procedure may fail. Based on existing technologies, the wireless device may drop/miss the PUSCH transmission, and thus the HARQ-ACK UCI transmission, when the LBT at the first PUSCH fails. This may result in inefficiency and extra overhead in handling (re)transmissions and HARQ processes, requiring more retransmissions and power consumption.

Based on existing technologies, the wireless device may use a last PUSCH of multiple PUSCHs scheduled by a DCI to transmit a HARQ-ACK UCI that overlaps with any of the multiple PUSCHs. As for LBT procedure, later PUSCHs may have higher chance of successful LBT and transmission because the wireless device may keep sensing the channel following the first LBT failure and reserve the channel upon a successful LBT. Also, because there is no gap between the PUSCHs, once the LBT is successful, the wireless device may transmit the remaining PUSCHs up to the last one. Thus, a likelihood of successful transmission for the last PUSCH may be higher than others. However, for a HARQ-ACK UCI that was scheduled on first PUSCH(s) of the multiple PUSCHs, to be transmitted via the last PUSCH may result in an undesired and increased latency. Considering that the number of multiple PUSCHs scheduled by the DCI may be up to eight, comprising up to eight slots, this latency for the HARQ-ACK transmission may be significantly large, especially in a BWP with a low numerology (~8 ms). The HARQ-ACK may be associated with a latency-sensitive data (e.g. URLLC applications). Therefore, it may be desired to design a mechanism that can handle HARQ-ACK UCI collision with a PUSCH of multiple PUSCHs scheduled by a DCI, such that a likelihood of successful transmission is increased, and at the same time, a latency of the HARQ-ACK transmission is maintained/not increased.

Embodiments may enable the network to configure HARQ-ACK transmission overlapped with multi-TTI PUSCH, indicating whether to map the HARQ-ACK to a fixed PUSCH of the multiple PUSCH (e.g., first or last or second to last) or to follow the scheduled timing of the HARQ-ACK and dynamically shift/move the HARQ-ACK transmission to another PUSCH based on the LBT result. For example, such configuration may depend on the type of traffic, e.g., based on sensitivity to latency and/or a priority index.

Based on the existing technology, the wireless device may multiplex all UCIs/HARQ-ACKs that overlap with any PUSCH of a multi-TTI/multi-slot PUSCH, in a fixed (e.g., first or last) PUSCH of the multiple PUSCHs scheduled by a DCI. This may result in reduced reliability and robustness of UCI/HARQ-ACK transmission. For example, if based on inter-UE and/or intra-UE prioritization, UE cancels/drops a PUCCH/PUSCH transmission, all UCIs/HARQ-ACK information may be lost. For example, if multiple UCIs are multiplexed in a same PUSCH transmission, then a number of resource elements of the PUSCH resource that are allocated to a transport block (data) transmission, or the multiple UCI transmissions, will be reduced. This may result in a performance/rate degradation of the data/UCI transmission, and the base station may not be able to successfully decode the data/UCIs. It may be more robust and more efficient to multiplex each UCI/HARQ-ACK in a PUSCH, of the multi-TTI PUSHs, corresponding to the scheduled/designated slot.

In an example, a PUCCH may overlap with a multi-TTI PUSCH and a second PUSCH (e.g., separate PUSCH on another cell). Based on existing technology, the wireless device may select a PUSCH that starts earlier. However, the second PUSCH may be on a licensed band and the multi-TTI PUSCH may be on an unlicensed band, and if the multi-TTI PUSCH starts earlier, a reliability of the PUCCH transmission may be decreased due to chance of LBT failure. Embodiments may propose solutions to avoid such performance degradation of HARQ-ACK.

In an example, there may be many HARQ-ACK UCIs overlapping with a plurality of slots/PUSCHs scheduled by a multi-TTI DCI. There may also be other UCIs comprising CSI report(s) present in the last PUSCH. Multiplexing many UCIs in the last PUSCH may result in an increased size of control information within a limited resource and may degrade a transmission of the control information and/or data in the PUSCH.

One or more mechanisms are proposed in the present disclosure to enhance a HARQ-ACK transmission that overlaps with one of multiple PUSCHs scheduled by a DCI (multi-TTI grant). One or more embodiments of the present disclosure may provide a wireless device with more opportunities and increased robustness for transmission of the overlapped HARQ-ACK via at least one of the multiple PUSCHs scheduled by the DCI, or via another PUSCH overlapped with any of the multiple PUSCHs. The embodiments may significantly reduce a latency of the HARQ-ACK transmission. The embodiments may provide higher reliability for transmitting HARQ-ACK information in an unlicensed spectrum (in a cell operating with shared spectrum channel access).

Additionally, when the wireless device determines to transmit a HARQ-ACK in a second slot that is different than the scheduled slot (e.g. the slot indicated by the PDSCH-to-HARQ feedback timing indicator value), there may be issues regarding the HARQ-ACK codebook. For example, one or more second HARQ-ACK codebooks may be scheduled/moved to the second slot. The wireless device may have to determine a combined HARQ-ACK codebook. There may be ambiguities regarding combining multiple HARQ-ACK codebooks into one, depending on the codebook type. Thus, a reliable codebook design is desired. One or more embodiments of the preset disclosure may enable a robust codebook design for combining multiple HARQ-ACK codebooks, overlapping with PUSCHs of a multi-TTI grant, in a single (e.g. last) PUSCH of the multi-TTI grant.

Based on existing technologies, a network may not schedule a downlink assignment for a wireless device, indicating a first slot for the corresponding HARQ-ACK transmission that overlaps with a first PUSCH, after the UL grant scheduling the PUSCH in the first slot. For example, if the wireless device receives a first DCI comprising an UL grant, that schedules a first PUSCH in a first slot, the wireless device may not expect to receive a second DCI, scheduling a PDSCH reception or SPS PDSCH release and indicating a PUCCH resource in the first slot for the corresponding HARQ-ACK transmission, after the first DCI. As a result, the network may be prohibited to schedule any PDSCH reception/SPS PDSCH release during a time from receiving an UL grant until the PUSCH transmission, if the PUCCH of the PDSCH reception/SPS PDSCH release is to be overlapped with the PUSCH transmission. In an unlicensed operation, the network may not have many options for scheduling downlink assignments and their corresponding PUCCH resources. Additionally, for the case of multi-TTI where the HARQ-ACK may be multiplexed in the last PUSCH of the multiple PUSCHs scheduled by the first DCI, a duration that the network is prohibited to schedule a PDSCH reception or SPS PDSCH release may be considerably long. So, it may desired to enable such a scheduling scenario for the case of multi-TTI scheduling to avoid the long delay and to provide more flexible options for the network. There may be a need to address the HARQ-ACK codebook design in such a case. One or more embodiments of the present disclosure may enable more flexible and efficient downlink scheduling and/or HARQ-ACK transmission during multiple slots that overlap with multiple PUSCHs scheduled by a single DCI (multi-TTI scenario).

A wireless device may receive a first DCI via a first downlink control channel (e.g. PDCCH) monitoring occasion. The first DCI may comprise one or more uplink grants. For example, the first DCI may schedule a plurality of uplink transmissions via a plurality of PUSCHs (e.g. multi-TTI grant). The plurality of PUSCHs may be scheduled on a plurality of slots. The plurality of slots may be consecutive. The first DCI may comprise a tome offset to an earliest slot of the plurality of slots. The plurality of PUSCHs may be contiguous in time, e.g. no time gap between any two consecutive PUSCHs from the plurality of PUSCHs.

The wireless device may receive a second DCI. The second DCI may be received via a second PDCCH monitoring occasion. For example, the second PDCCH occasion may not be later that the first PDCCH monitoring occasion. For example, the wireless device may receive the second DCI before the first DCI.

The second DCI may comprise one or more downlink assignments. For example, the second DCI may schedule one or more PDSCH receptions and/or semi-persistent scheduling (SPS) PDSCH release. The second DCI may comprise a time offset (e.g. PDSCH-to-HARQ feedback timing indicator value) indicating a first slot for transmission of HARQ-ACK information corresponding to the one or more PDSCH receptions/SPS PDSCH release.

The wireless device may receive an RRC message configuring one or more DL SPS configurations. The wireless device may receive a DCI activating a DL SPS configuration. The wireless device may determine a HARQ feedback timing value/offset of a DL SPS configuration based on the DCI and/or the RRC message. The wireless device may determine a first SPS PDSCH reception associated with the DL SPS configuration. The wireless device may determine the first slot, based on the HARQ feedback timing value/offset, for transmission of HARQ-ACK information associated with the first SPS PDSCH reception.

The first slot may be scheduled with one or more PUCCHs for transmission of one or more HARQ-ACKs associated with one or more PDSCH receptions/SPS PDSCH receptions/SPS PDSCH release. The first slot may overlap with the plurality of slots, scheduled by the first DCI for the plurality of/multiple PUSCHs. For example, the plurality of slots may comprise the first slot. For example, the one or more PUCCHs may overlap in time with a first PUSCH from the plurality of PUSCHs.

The wireless device may multiplex a UCI comprising the one or more HARQ-ACKs in the first PUSCH of the plurality of PUSCHs, in the first slot. The wireless device may use a beta-offset value indicated by the first DCI to multiplex the UCI in the first PUSCH. The wireless device may determine a number of resource elements of the first PUSCH resource for mapping/multiplexing the UCI and for the transmission of the UCI via the PUSCH.

In an example, the first DCI may comprise/indicate a single beta-offset indicator field for multiplexing HARQ-ACK UCIs (e.g. of the same size group) in any of the PUSCHs from the plurality of PUSCHs. In an example, the first DCI may comprise/indicate multiple beta-offset indicator fields for the plurality of PUSCHs, e.g. a beta-offset indicator field per PUSCH. The wireless device may determine a beta-offset value for multiplexing the HARQ-ACK UCI in a PUSCH from the plurality of PUSCHs, based on the corresponding beta-offset indicator field on the PUSCH in the scheduling DCI and/or the HARQ-ACK information size/number of bits.

The wireless device may multiplex a first transport block (TB) in the first PUSCH. The wireless device may perform a first listen before talk (LBT) procedure prior to the transmission of the first PUSCH in the first slot. The wireless device may determine a failure of the first LBT procedure. For example, the first LBT procedure may indicate a busy channel. The wireless device may not transmit the first TB and/or the HARQ-ACK UCI via the first PUSCH due to the failure of the first LBT.

The wireless device may perform a second LBT procedure prior to transmission of a next PUSCH, e.g. in the next slot after the first slot. In case of a failure of the second LBT procedure, the wireless device may continue sensing the channel/perform another LBT procedure prior to the next PUSCH transmission and so on, until a successful LBT is performed and a channel access is granted for one or more PUSCH transmissions of the remaining PUSCHs.

In response to the failure of the first LBT procedure at the first slot, the wireless device may determine a second slot from the plurality of slots for transmission of the UCI comprising the one or more HARQ-ACKs. For example, the second slot may be a last slot of the plurality of lots. For example, the second slot may be a second last (one before last) slot of the plurality of lots. For example, the second slot may be a next slot immediately after the first slot. The wireless device may determine a second PUSCH of the plurality of PUSCHs scheduled by the DCI in the second slot.

The wireless device may determine a second PUSCH from the plurality of PUSCHs for transmission of the UCI comprising the one or more HARQ-ACKs. For example, the second PUSCH may be a last PUSCH of the plurality of PUSCHs. For example, the second PUSCH may be a second last (one before last) PUSCH of the plurality of PUSCHs. For example, the second PUSCH may be a next slot PUSCH immediately after the first PUSCH. For example, the second PUSCH may be a next PUSCH, of the plurality of PUSCHs, after the first PUSCH that meets one or more criteria.

For example, the second PUSCH may be a next/earliest PUSCH after the first PUSCH with a same beta-offset indicator field/index/value as the first PUSCH. For example, a beta-offset indicator field of the second PUSCH may be same as the beta-offset indicator field of the first PUSCH. The beta-offset indicator field of the first PUSCH and/or the second PUSCH may be the same and/or indicated by the DCI scheduling the plurality of PUSCHs. The beta-offset indicator fields of the first PUSCH and the second PUSCH may be different. In case the beta-offset indicator field of the first PUSCH and/or the second PUSCH are the same, the wireless device may determine a first and a second beta-offset value for multiplexing the one or more HARQ-ACKs in the first and the second PUSCH based on the one or more HARQ-ACKs bit size. For example, the wireless device may determine a same beta-offset value to multiplex the one or more HARQ-ACKs in the first PUSCH and the second PUSCH. For example, no second UCI comprising second HARQ-ACK information may be mapped to the second PUSCH. For example, a size of the aggregated/total/combined HARQ-ACK information bits in the second PUSCH and the first PUSCH may be the same. For example, a size of the aggregated/total/combined HARQ-ACK information bits in the second PUSCH and the first PUSCH may be different. For example, a second UCI comprising one or more second HARQ-ACKs may be mapped to the second PUSCH. For example, the wireless device may use a second beta-offset value for multiplexing a combined HARQ-ACK codebook, comprising the one or more HARQ-ACKs and the second one or more HARQ-ACKs, in the second PUSCH. For example, the wireless device may scale a first beta-offset value indicated in the DCI scheduling the plurality of PUSCHs. For example, the DCI may indicate a scaling factor to apply to the first beta-offset value. For example, the DCI may indicate a plurality of scaling factors, and the base station may select one of the plurality of scaling factors, based on a size of the combined HARQ-ACK codebook in the second PUSCH/slot. For example, the DCI may indicate a second beta-offset value for the second PUSCH.

For example, the second PUSCH may be a next/earliest PUSCH after the first PUSCH with a same TB size (TBS) as the first PUSCH. A TBS of a PUSCH may be determined based on a resource size (e.g. a number of resource elements in the PUSCH resource). The wireless device may determine the TBS of the PUSCH based on time domain resource allocation (TDRA) of the PUSCH and/or the frequency domain resource allocation (FDRA) of the PUSCH and/o the modulation and coding scheme (MCS) of the PUSCH. In an example, a TBS associated with the second PUSCH may be same as the TBS associated with the first PUSCH. In an example, a TBS associated with the second PUSCH may be different from the TBS associated with the first PUSCH. For example, the wireless device may multiplex/transmit the first TB (originally meant to be transmitted via the first PUSCH) in the second PUSCH. For example, the wireless device may multiplex/transmit the first TB and the HARQ-ACK UCI in the second PUSCH. For example, the wireless device may multiplex/transmit the HARQ-ACK UCI in the second PUSCH if the UE multiplexes/transmits the first TB in the second PUSCH. For example, the wireless device may move the HARQ-ACK UCI and the first TB together to the second PUSCH. For example, the wireless device may not transmit the UCI via the second PUSCH if the wireless device cannot transmit the first TB via the second PUSCH. For example, the wireless device may not multiplex/transmit the first TB in the second PUSCH. For example, the wireless device may multiplex/transmit the first TB in the second PUSCH if the TBS of the second PUSCH is same as the TBS of the first PUSCH. For example, the wireless device may multiplex/transmit the first TB via a third PUSCH. The third PUSCH may not be the second PUSCH. The third PUSCH may have a same TBS as the first PUSCH.

For example, the second PUSCH may be a next/earliest PUSCH after the first PUSCH with a same RV as the first PUSCH. In an example, an RV associated with the second PUSCH may be same as the RV associated with the first PUSCH.

For example, the second PUSCH may be a next/earliest PUSCH after the first PUSCH with a same NDI value as the first PUSCH. In an example, an NDI associated with the second PUSCH and the NDI associated with the first PUSCH may both indicate a new data transmission. In an example, the NDI associated with the second PUSCH and the NDI associated with the first PUSCH may both indicate a retransmission.

Figure 21:
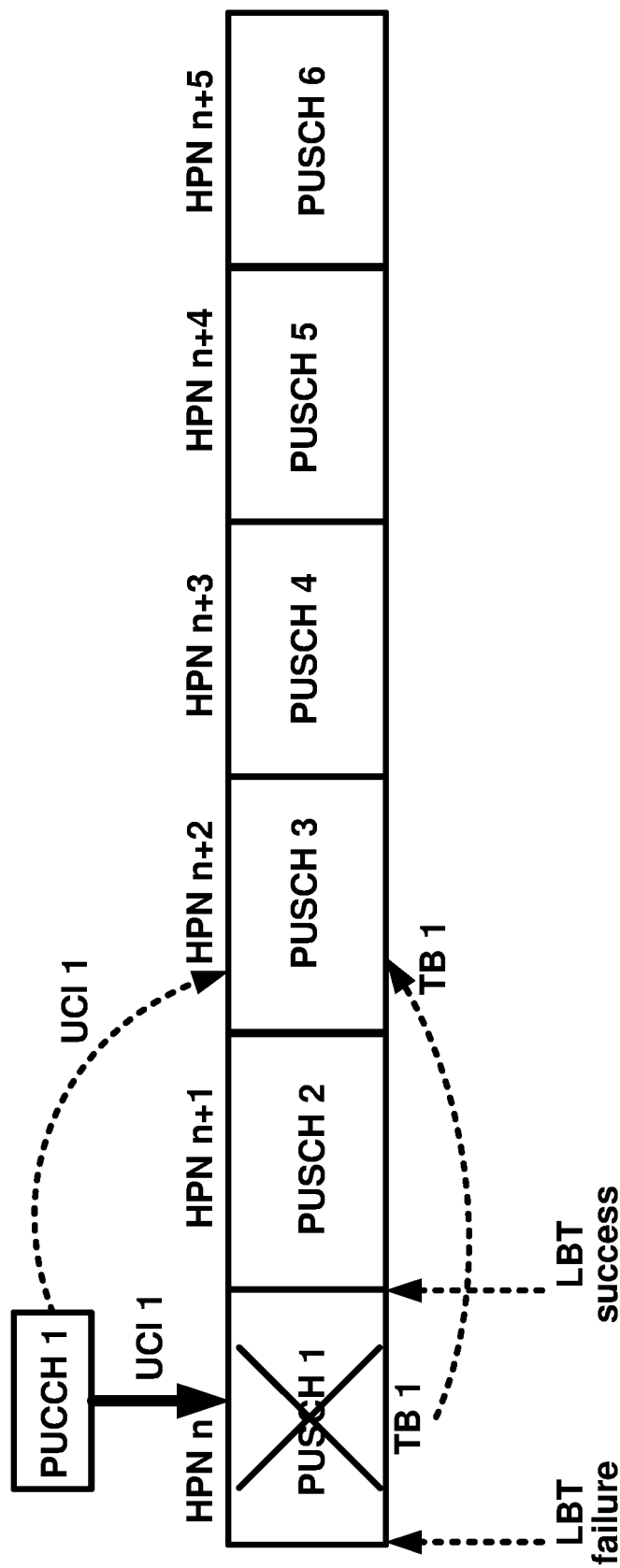
FIG. 21 shows an example of moving an overlapping HARQ-ACK UCI within multiple PUSCHs scheduled by a DCI, according to some embodiments of the present disclosure.

FIG. 21 shows an example of moving an overlapping HARQ-ACK UCI within multiple PUSCHs scheduled by a DCI, according to some embodiments. The DCI may schedule multiple contiguous PUSCHs. In FIG. 21, 6 PUSCHs (PUSCH 1 to PUSCH 6) are scheduled. The DCI may indicate a HARQ process number associated with the first PUSCH (HPN n). The wireless device may determine the HARQ process numbers of the rest of the PUSCHs by incrementing the indicated HPN: HPN n+1 for PUSCH-2, HPN n+2 for PUSCH-3, . . . , HPN n+5 for PUSCH-6. The DCI may indicate a separate TDRA and/or NDI value and/or RV for the multiple PUSCHs. The wireless device may determine a TBS and/or NDI and/or RV and/or beta-offset value for each of the multiple PUSCHs.

As shown in FIG. 21, the wireless device may determine a PUCCH transmission (PUCCH 1) overlap in time with the first PUSCH (PUSCH 1) transmission. The PUCCH transmission may comprise a UCI (UCI 1) comprising HARQ-ACK information (HARQ-ACK 1). The wireless device may multiplex the UCI in the first PUSCH and may not transmit the PUCCH. The wireless device may prepare a first TB (TB 1) to transmit via PUSCH 1 using HARQ process number n. The wireless device may prepare the PUSCH 1 transmission comprising TB 1 and UCI 1. The DCI may indicate a starting symbol for the first PUSCH. The wireless device may perform an LBT procedure prior to the starting symbol of the first PUSCH (PUSCH 1). The LBT procedure prior to PUSCH 1 may fails and the wireless device may not transmit PUSCH 1 comprising TB 1 and UCI 1. The wireless device may determine another PUSCH for transmission of UCI 1 and/or TB 1, e.g. PUSCH 3 as shown in the figure. For example, TB 1 may be a new TB. For example, NDI values of PUSCH 1 and PUSCH 3 may indicate a new data transmission. For example, TBS and/or RV of PUSCH 1 and PUSCH 3 may be the same. Thus, the wireless device may determine to transmit TB 1 via PUSCH 3. The wireless device may determine to transmit the UCI 1 with a same PUSCH that it uses for transmission of TB 1. For example, the wireless device may determine to transmit TB 1 and UCI 1 via PUSCH 3. For example, PUSCH 3 may be a first PUSCH after PUSCH 1 with the same TBS and/or RV that may indicate a new data transmission via NDI. For example, PUSCH 2 may not have a same TBS/RV/NDI as PUSCH 1. The wireless device may perform another LBT for a next PUSCH transmission. For example, the wireless device may perform a successful LBT prior to PUSCH 2. The wireless device may access the channel and continuously transmit via PUSHC 2 and the rest of the PUSCHs until PUSCH 6. The wireless device may transmit UCI 1 comprising the HARQ-ACK information and TB 1 via PUSCH 3.

Figure 22A:
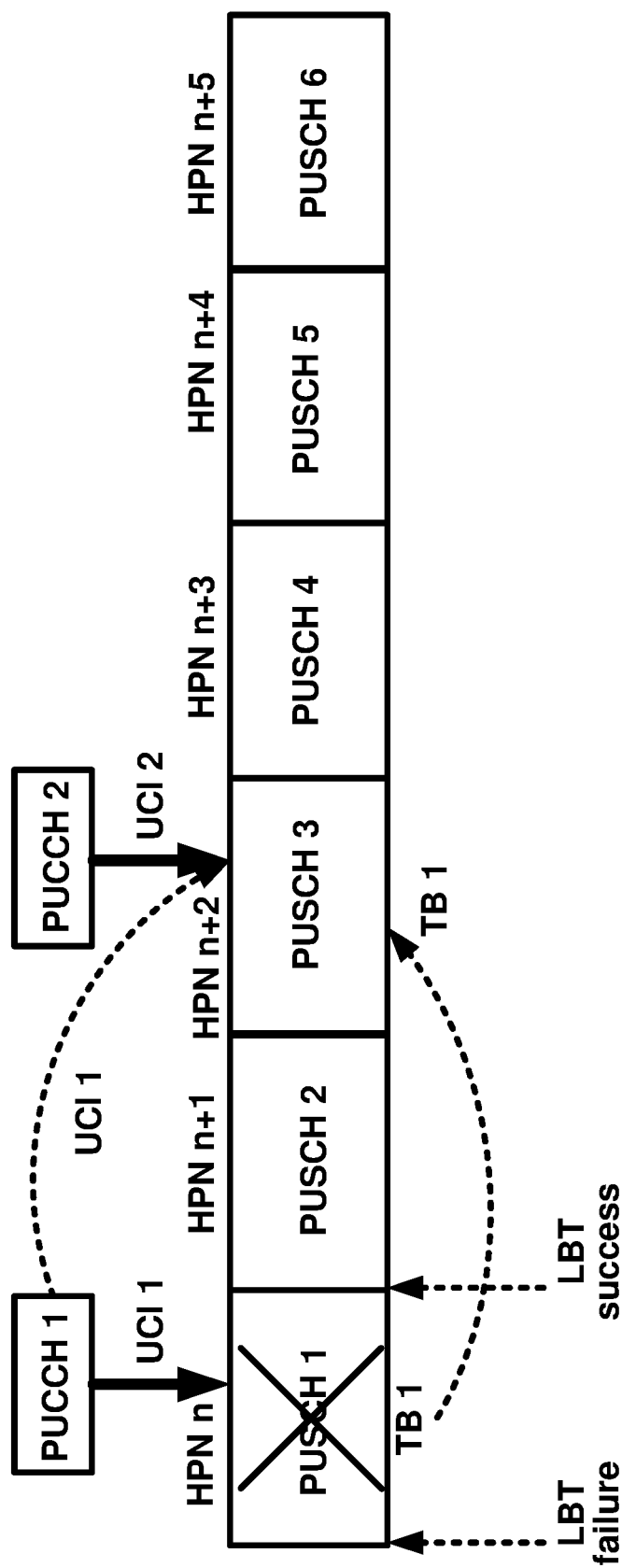
FIG. 22A and FIG. 22B show examples of multiple HARQ-ACK UCIs overlapping with multiple PUSCHs scheduled by a DCI, according to some embodiments of the present disclosure.
Figure 22B:

FIG. 22A shows an example of multiple HARQ-ACK UCIs overlapping with multiple PUSCHs scheduled by a DCI, according to some embodiments. As shown in FIG. 22A, UCI 1 comprising HARQ-ACK 1 is scheduled at PUCCH 1 that overlaps with PUSCH 1. Due to LBT failure at PUSCH 1, the wireless device determines to transmit UCI 1 via PUSHC 3. The wireless device determines that UCI 2 comprising HARQ-ACK 2 is scheduled at PUCCH 2 that overlaps with PUSCH 3. The wireless device may transmit both HARQ-ACK 1 and HARQ-ACK 2 via PUSCH 3. The wireless device may multiplex UCI 1 and UCI 2 in PUSCH 3, separately. For example, the wireless device may use same or different beta-offset values for multiplexing UCI 1 and UCI 2 in PUSCH 3. The wireless device may combine the two UCIs for multiplexing in PUSCH 3. For example, the wireless device may determine combined UCI comprising a combined/aggregated HARQ-ACK codebook. The combined HARQ-ACK codebook comprises both HARQ-ACK 1 and HARQ-ACK 2. The HARQ-ACK codebooks may or may not change in the combined codebook. FIG. 22B shows an example of combined HARQ-ACK codebook. As shown in this figure, the two HARQ-ACK codebooks may be concatenated in an order of corresponding PUCCH times, e.g. without any changes.

In an example, PUCCH 2 in FIG. 22A may comprise other UCIs, e.g. CSI report(s). The wireless device may drop at least one UCI comprising CSI report in response to determining to transmit/multiplex UCI 1 comprising HARQ-ACK 1 via PUSCH 3.

The wireless device may drop the at least one UCI comprising CSI report if a size of the combined HARQ-ACK codebook is larger than a threshold. The wireless device may apply a scaling factor to one or more beta-offset values that the wireless device uses for multiplexing the at least one UCI comprising CSI report and/or the HARQ-ACK codebooks, for example, if the size of the combined HARQ-ACK codebook is larger than a threshold. The threshold may be pre-defined/configured by RRC/indicated by the DCI. The scaling factor may be pre-defined/configured by RRC/indicated by the DCI. The wireless device may scale the beta-offset value, for example, if an UL-SCH is multiplexed in the second PUSCH. The wireless device may transmit the PUCCH and drop the PUSCH transmission, for example, if no UL-SCH is multiplexed in the second PUSCH. The wireless device may skip the MAC PDU transmission via the second PUSCH and transmit the UCI via the second PUSCH, for example, if no UL-SCH is multiplexed in the MAC PDU.

In an example, in response to the first LBT failure at the first PUSCH, the wireless device may determine to transmit the HARQ-ACK UCI of the first slot in the next PUSCH, e.g. in a second PUSCH of the multiple PUSCHs schedule by a DCI, that immediately follows the first PUSCH. The wireless device may transmit the first TB, scheduled on the first PUSCH, and the UCI via the second PUSCH. For example, a TBS and/or RV of the second PUSCH and the first PUSCH may or may not be the same. For example, the NDI of the first PUSCH and the second PUSCH both may indicate a new data transmission. For example, the NDI of the second PUSCH may indicate a retransmission. For example, the wireless device may overwrite a pending TB in the HARQ process associated with the second PUSCH. The base station, in response to not detecting/receiving the first PUSCH (e.g. detecting DTX) may determine the LBT failure, and may expect that the wireless device transmits the UCI and/or the TB via the second PUSCH. The, base station may expect that the retransmission scheduled on the second PUSCH may be overwritten. For example, a transmission comprising a new TB and a UCI may have higher priority than a retransmission of a pending TB. For example, the RRC may configure whether this priority applies/is enabled or not.

The wireless device may transmit the TB and the UCI together via the second PUSCH. For example, the second PUSCH may be immediately following the first PUSCH, and the wireless device may transmit the UCI and the TB via the second PUSCH irrespective of the TBS and/or RV and/or NDI. The wireless device may transmit the UCI and TB separately. For example, the wireless device may not transmit the TB via any of the remaining PUSCHs from the multiple PUSCHs scheduled by the DCI. The wireless device may transmit the UCI via the second PUSCH from the multiple PUSCHs scheduled by the DCI. For example, the wireless device may transmit the TB via a third PUSCH from the multiple PUSCHs scheduled by the DCI. The third PUSCH may not be the second PUSCH. For example, the third PUSCH may not be immediately following the first PUSCH. For example, the third PUSCH may be any PUSCH with same TBS/RV/NDI as the first PUSCH. For example, the second PUSCH may not have same TB S/RV/NDI as the first PUSCH.

For example, RRC signaling may indicate whether the wireless device maps any overlapping HARQ-ACK with a multi-TTI PUSCH to a fixed PUSCH (e.g., the last/second last) of the multiple PUSCHs or whether the wireless device follows the scheduled HARQ-ACK transmissions and moves/shifts/maps the HARQ-ACK to another PUSCH within the multi-TTI PUSCH in response to LBT failure. For example, RRC may enable the dynamic shifting/moving of HARQ-ACK within multi-TTI PUSCH for a latency-sensitive data (e.g. based on logical channel and/or type of traffic such as URLLC). For example, RRC may disable the dynamic shifting/moving of HARQ-ACK within multi-TTI PUSCH for a latency-insensitive data. For example, RRC may enable/disable the dynamic shifting/moving of HARQ-ACK within multi-TTI PUSCH based on an LBT type and/or CAPC of the multi-TTI PUSCH. In an example, the wireless device may only move/map HARQ-ACK bit(s) corresponding to SPS PDSCH(s) to the last/second last PUSCH. For example, for a HARQ-ACK information corresponding to dynamic grant/DCI (e.g. PDSCH reception/SPS PDSCH release), the wireless device may follow the grant and transmit the HARQ-ACK via a first PUSCH of the multi-TTI PUSCHs in the indicated slot.

The wireless device may determine to transmit a UCI in a first slot where a PUCCH is scheduled. The UCI may comprise HARQ-ACK information. The UCI may comprise CSI report. The PUCCH may overlap with a first PUSCH of multiple PUSCHs scheduled by a DCI in the first slot. The PUCCH may be configured on a licensed cell (e.g. a cell not operating with shared spectrum channel access). The multiple PUSCHs may be configured on an unlicensed cell (e.g. a cell operating with shared spectrum channel access). The wireless device may not transmit/piggyback the UCI on the first PUSCH. The wireless device may transmit the UCI via the PUCCH on the licensed cell. The wireless device may be capable of transmitting the PUCCH and the first PUSCH in parallel on the two cells. The wireless device may drop one of the overlapping transmissions (e.g. the first PUSCH), if not capable of parallel transmission. The wireless device may transmit/piggyback the UCI on the first PUSCH if the first PUSCH is a last/second last PUSCH of the multiple PUSCHs. The wireless device may transmit/piggyback the UCI on the first PUSCH, for example, if the first PUSCH transmission requires no LBT (e.g. CAT1 LBT) and/or short LBT (e.g. CAT2 LBT) and/or LBT with a high priority (e.g. CAT4 LBT with low(est) CAPC). The wireless device may transmit/piggyback the UCI on the first PUSCH, for example, if the wireless device is not scheduled with any other PUSCH transmission in the first slots (overlapping with the PUCCH) on a licensed cell. For example, if the wireless device is scheduled with a third PUCSH on a licensed cell in the first slot, the wireless device may transmit the UCI via the third PUSCH. The third PUSCH may have a lower priority than the first PUSCH. The third PUSCH may be a configured grant PUSCH. For example, if the wireless device is scheduled with a third PUCSH on a licensed cell during any of the slots scheduled with the multiple PUSCHs (any slot of the multi-TTI PUSCH), the wireless device may transmit the UCI via the third PUSCH.

The third PUSCH may have a lower priority that any of the multiple PUSCHs. The third PUSCH may be a configured grant PUSCH. As a result, a reliability of the control information transmission may be enhanced by transmitting the control information in a licensed cell or if in an unlicensed cell, using a resource that has high likelihood of LBT success.

Figure 23:
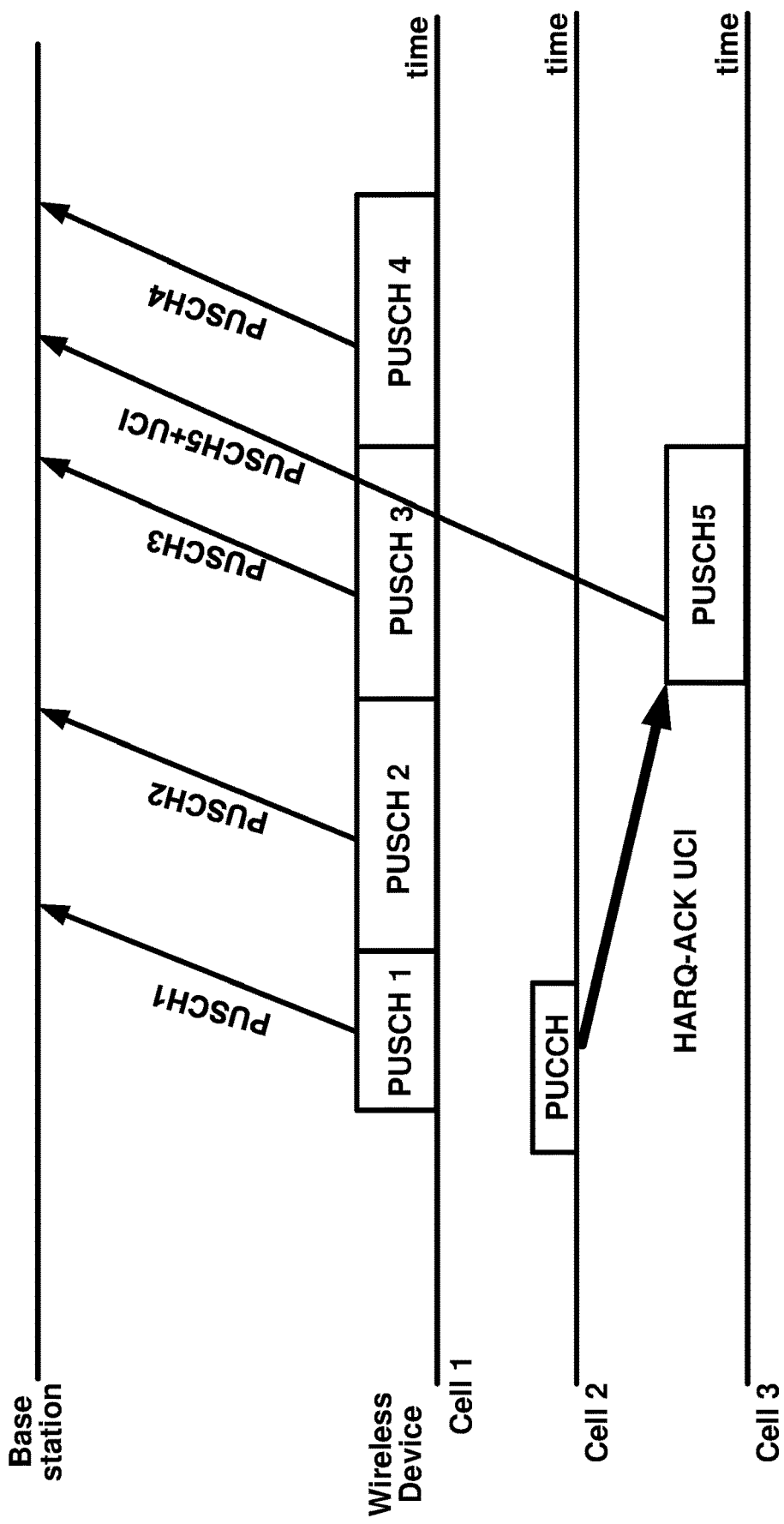
FIG. 23 shows an example of HARQ-ACK collision with multi-TTI PUSCH in a carrier aggregation scenario, according to some embodiments of the present disclosure.

FIG. 23 shows an example of HARQ-ACK collision with multi-TTI PUSCH in a carrier aggregation scenario, according to some embodiments. As shown in FIG. 23, a PUCCH may be scheduled for HARQ-ACK transmission in cell 2. The PUCCH may overlap with a first PUSCH (PUSCH1 in figure) of multiple PUSCHs scheduled by a DCI (e.g. multi-TTI PUSCH). The multiple PUSCHs may be scheduled on cell 1 (e.g. an unlicensed cell). Another PUSCH may be scheduled in cell 3 (PUSCH5 in the figure) that overlaps with a second PUSCH (PUSCH3) of the multiple PUSCHs. As shown in the figure, the wireless device may transmit the HARQ-ACK UCI via PUSCH5 in cell 3, for example, in response to determining that cell 3 is a licensed cell. In an example, the wireless device may transmit the HARQ-ACK UCI via PUSCH1 on cell1, for example, in response to determining a CAT1/CAT2 LBT or CAT4 LBT with low CAPC for transmission of PUSCH1. In an example, the wireless device may transmit the HARQ-ACK UCI via PUSCH5 in response to a failure of the LBT at PUSCH1.

Figure 24:
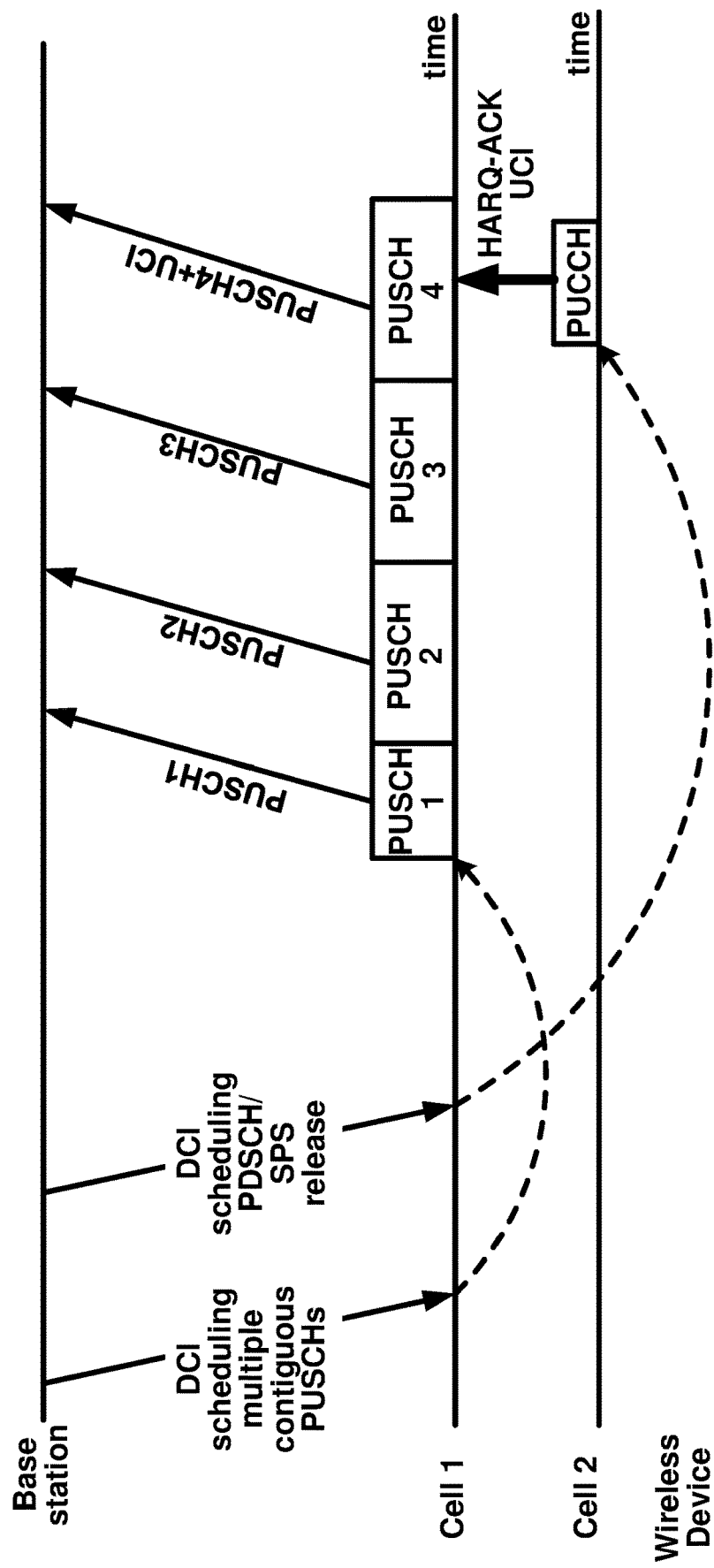
FIG. 24 shows an example of HARQ-ACK collision with multi-TTI PUSCH, according to some embodiments of the present disclosure.

FIG. 24 shows an example of HARQ-ACK collision with multi-TTI PUSCH, according to some embodiments. As shown in this example, the wireless device may receive a first DCI comprising an UL grant. The first DCI may schedule multiple PUSCHs in a plurality of slots in cell 1. The wireless device may receive a second DCI, after the first DCI, scheduling a PDSCH reception and/or SPS PDSCH release. The second DCI may indicate a PUCCH resource in a slot in cell 2 for the corresponding HARQ-ACK transmission, wherein the slot overlaps with the plurality of slots scheduled for multiple PUSCHs by the first DCI. For example, the plurality of slots comprises the slot. The PUCCH may overlap with a PUSCH from the multiple PUSCHs (e.g. PUSCH4 in the figure). The wireless device may transmit a UCI comprising the HARQ-ACK via the PUCCH in cell 2. For example, cell 2 may be a licensed cell. For example, the wireless device may be capable of parallel transmission of PUSCH4 in cell 1 and the PUCCH in cell 2. In another example, the wireless device may determine to transmit the UCI comprising the HARQ-ACK via the overlapping PUSCH in cell 1 (e.g. PUSCH 4).

In an example, the wireless device may not expect to detect a DCI format scheduling a PDSCH reception or a SPS PDSCH release and indicating a resource for a PUCCH transmission with corresponding HARQ-ACK information in a slot overlapping with a multi-TTI PUSCH if the wireless device previously detects a DCI format scheduling the multi-TTI PUSCH transmission and if the wireless device multiplexes HARQ-ACK information in a PUSCH of the multi-TTI transmission.

In an example, the wireless device may not expect to detect a DCI format scheduling a PDSCH reception or a SPS PDSCH release and indicating a resource for a PUCCH transmission with corresponding HARQ-ACK information in a slot overlapping with a PUSCH of a multi-TTI PUSCH unless the PUSCH is the last on the multiple PUSCHs of the multi-TTI PUSCH.

In an example, a one-shot feedback transmission may be scheduled on a first slot overlapping with a first (e.g. any) PUSCH of the multi-TTI PUSCH. One or more other HARQ-ACK transmissions may be scheduled on one or more second slots overlapping with one or more second PUSCHs of the multi-TTI PUSCH. The wireless device may drop/not transmit the one or more HARQ-ACKs in response to determining that the one-shot feedback transmission overlaps with the multi-TTI PUSCH.

For a dynamic codebook transmission via a PUSCH, the wireless device may determine a size of the codebook based on an UL DAI value indicated by the DCI scheduling the PUSCH. For a multi-TTI PUSCH, when combining multiple HARQ-ACK codebooks into one (e.g. concatenating), size of the HARQ-ACK codebook may increase, e.g. due to recent downlink assignments scheduled after receiving the first DCI (e.g. as in FIG. 24). To overcome any ambiguities, the wireless device may determine a size of the HARQ-ACK codebook by summing/adding the corresponding DAI values (e.g. the UL DAI+ the DAI indicated by a last DL DCI scheduling HARQ-ACK transmission that overlaps with multi-TTI PUSCH, if received after the first DCI). In an example, the wireless device may expect that the UL DAI value indicated in the first DCI scheduling the multiple PUSCHs is equal to sum of DL DAI values including the one or more DL DAI values indicated by last DL DCI(s) scheduling HARQ-ACK transmission that overlap with multi-TTI PUSCH.

For an enhanced dynamic codebook, concatenating multiple HARQ-ACK codebooks may be in an order of PDSCH group followed by an order of corresponding PUCCH time.

For semi-static codebook, the combined HARQ-ACK codebook may not be a concatenation of the codebooks. For example, the combine codebook may be determined based on a cardinality of PDCCH monitoring occasions comprising those that are associated with each of the HARQ-ACK codebooks.

What is claimed is:

1. A method comprising:
receiving, by a wireless device, a first downlink control information (DCI) indicating a first slot for transmission of uplink control information (UCI) comprising hybrid automatic repeat request (HARQ) feedback information;
receiving a second DCI scheduling a plurality of physical uplink shared channels (PUSCHs) in a plurality of consecutive slots comprising the first slot;
multiplexing the UCI in a first PUSCH, of the plurality of PUSCHs, in the first slot;
in response to a failed listen-before-talk (LBT) procedure for the first slot, determining a second slot associated with a second PUSCH of the plurality of PUSCHs; and
transmitting, in response to a successful LBT procedure for the second slot, the UCI via the second PUSCH.

2. The method of claim 1, further comprising performing a first LBT procedure for the first slot for transmission of the first PUSCH, wherein the first LBT procedure indicates a busy channel and the first PUSCH is not transmitted.

3. The method of claim 1, further comprising multiplexing the UCI in the second PUSCH.

4. The method of claim 1, wherein a first beta-offset value associated with the first PUSCH is equal to a second beta-offset value associated with the second PUSCH.

5. The method of claim 1, wherein a first transport block size (TBS) associated with the first PUSCH is equal to a second TBS associated with the second PUSCH.

6. The method of claim 5, wherein a first new data indicator (NDI) value and a first redundancy version (RV) associated with the first PUSCH are equal to a second NDI value and a second RV associated with the second PUSCH, respectively.

7. The method of claim 1, further comprising multiplexing a first transport block (TB) in the first PUSCH, and multiplexing the UCI and a second TB in the second PUSCH.

8. The method of claim 7, wherein the second TB is the first TB.

9. The method of claim 7, further comprising, in response to the failed LBT procedure for the first slot, transmitting the first TB via a third PUSCH from the plurality of PUSCHs, that is different than the second PUSCH.

10. The method of claim 1, wherein the second PUSCH is a next PUSCH, among the plurality of PUSCHs, immediately after the first PUSCH.

11. A wireless device comprising:
one or more processors; and
memory storing instructions that, when executed by the one or more processors, cause the wireless device to:
receive a first downlink control information (DCI) indicating a first slot for transmission of uplink control information (UCI) comprising hybrid automatic repeat request (HARQ) feedback information;
receive a second DCI scheduling a plurality of physical uplink shared channels (PUSCHs) in a plurality of consecutive slots comprising the first slot;
multiplex the UCI in a first PUSCH, of the plurality of PUSCHs, in the first slot;
in response to a failed listen-before-talk (LBT) procedure for the first slot, determine a second slot associated with a second PUSCH of the plurality of PUSCHs; and
transmit, in response to a successful LBT procedure for the second slot, the UCI via the second PUSCH.

12. The wireless device of claim 11, wherein the instructions further cause the wireless device to perform a first LBT procedure for the first slot for transmission of the first PUSCH, wherein the first LBT procedure indicates a busy channel and the first PUSCH is not transmitted.

13. The wireless device of claim 11, wherein the instructions further cause the wireless device to multiplex the UCI in the second PUSCH.

14. The wireless device of claim 11, wherein a first beta-offset value associated with the first PUSCH is equal to a second beta-offset value associated with the second PUSCH.

15. The wireless device of claim 11, wherein a first transport block size (TBS) associated with the first PUSCH is equal to a second TBS associated with the second PUSCH.

16. The wireless device of claim 15, wherein a first new data indicator (NDI) value and a first redundancy version (RV) associated with the first PUSCH are equal to a second NDI value and a second RV associated with the second PUSCH, respectively.

17. The wireless device of claim 11, wherein the instructions further cause the wireless device to multiplex a first transport block (TB) in the first PUSCH, and multiplexing the UCI and a second TB in the second PUSCH.

18. The wireless device of claim 17, wherein the second TB is the first TB.

19. The wireless device of claim 11, wherein the instructions further cause the wireless device to transmit, in response to the failed LBT procedure for the first slot, the first TB via a third PUSCH from the plurality of PUSCHs, that is different than the second PUSCH.

20. A system comprising:
a base station; and
a wireless device comprising:
one or more processors; and
memory storing instructions that, when executed by the one or more processors, cause the wireless device to:
receive, from the base station, a first downlink control information (DCI) indicating a first slot for transmission of uplink control information (UCI) comprising hybrid automatic repeat request (HARQ) feedback information;
receive, from the base station, a second DCI scheduling a plurality of physical uplink shared channels (PUSCHs) in a plurality of consecutive slots comprising the first slot;
multiplex the UCI in a first PUSCH, of the plurality of PUSCHs, in the first slot;
in response to a failed listen-before-talk (LBT) procedure for the first slot, determine a second slot associated with a second PUSCH of the plurality of PUSCHs; and
transmit, to the base station and in response to a successful LBT procedure for the second slot, the UCI via the second PUSCH.

* * * * *